(12) United States Patent
Stayskal et al.

(10) Patent No.: US 11,627,123 B2
(45) Date of Patent: Apr. 11, 2023

(54) TECHNIQUES FOR SIMULTANEOUSLY ACCESSING MULTIPLE ISOLATED SYSTEMS WHILE MAINTAINING SECURITY BOUNDARIES

(71) Applicant: Oracle International Corporation, Redwood Shores, CA (US)

(72) Inventors: Danne Lauren Stayskal, Eastsound, WA (US); Vladimir Cabildo, Kirkland, WA (US); Jorge Enrique Reyes Salas, Kenmore, WA (US); Alaa Shaker, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 347 days.

(21) Appl. No.: 17/069,576

(22) Filed: Oct. 13, 2020

(65) Prior Publication Data
US 2022/0116376 A1 Apr. 14, 2022

(51) Int. Cl.
*H04L 9/40* (2022.01)
*H04L 65/1069* (2022.01)

(52) U.S. Cl.
CPC .............. *H04L 63/08* (2013.01); *H04L 63/20* (2013.01); *H04L 65/1069* (2013.01)

(58) Field of Classification Search
CPC ... H04L 63/0442; H04L 63/08; H04L 63/126; H04L 63/20; H04L 65/1069; H04L 65/4015
See application file for complete search history.

(56) References Cited

U.S. PATENT DOCUMENTS

| | | | |
|---|---|---|---|
| 2019/0289019 A1* | 9/2019 | Thekadath | G06F 16/27 |
| 2020/0125418 A1* | 4/2020 | Christudas | G06F 9/5077 |
| 2020/0244755 A1* | 7/2020 | Althaus | H04L 63/0815 |
| 2020/0382488 A1* | 12/2020 | Liu | H04L 63/0815 |
| 2021/0141770 A1* | 5/2021 | Wang | G06F 16/185 |

* cited by examiner

*Primary Examiner* — Gil H. Lee
(74) *Attorney, Agent, or Firm* — Kilpatrick Townsend & Stockton LLP

(57) ABSTRACT

Techniques are described for using a single application to interact with multiple separate realms simultaneously while maintaining data security boundaries. For example, a web browser may be used to access and interact with the multiple separate secure realms while maintaining data security boundaries between the systems. Multiple concurrent sessions may be established for a user between the web browser and multiple realms. Separate sets of security credentials (e.g., credentials used for authentication and authorization purposes) may be used to establish the sessions and for operations performed in the realms via the sessions. The application can also execute logic (e.g., via machine-executable code or instructions) for automating operations performed in the realms, such as, automating the initiation of a certain operation in one realm based upon a response received from another realm, causing operations to be initiated in two different realms such that the operations overlap in the time; and the like.

19 Claims, 11 Drawing Sheets

TECHNIQUES FOR SIMULTANEOUSLY ACCESSING MULTIPLE ISOLATED SYSTEMS WHILE MAINTAINING SECURITY BOUNDARIES

BACKGROUND

The demand for cloud-based services continues to increase rapidly. The term cloud service is generally used to refer to a service that is made available by a cloud services provider to users or customers on demand (e.g., via a subscription model) using systems and infrastructure (cloud infrastructure) provided by the cloud services provider. Typically, the servers and systems that make up the cloud service provider's infrastructure are separate from the customer's own on-premise servers and systems. Customers can thus avail themselves of cloud services provided by a cloud service provider without having to purchase separate hardware and software resources for the services. There are various different types or models of cloud services including Software-as-a-Service (SaaS), Platform-as-a-Service (PaaS), Infrastructure-as-a-Service (IaaS), and others.

In an IaaS model, the cloud services provider provides infrastructure resources (e.g., compute resource, memory resources, networking resources such as servers, storage devices, etc.) that can be used by customers to build their own resource and compute networks. The infrastructure provided by the IaaS cloud service provider comprising interconnected high-performance compute, memory, and network resources or components forms a physical network (also referred to as a substrate network or underlay network). The physical network provides the underlying basis for creating customers' virtual networks (also referred to as overlay networks) on top of the physical network. The cloud service provider generally provides a wide range of applications, services, and APIs that enable customers (e.g., enterprises) to efficiently build these virtual networks, and deploy and manage various virtual workloads (e.g., virtual machines, containers, applications) in these virtual networks in a highly available distributed environment. Customers can generally manage their cloud-based workloads in the same way they manage their on-premises workloads and get all benefits of the high-performance computing and network capabilities with the same control, isolation, security, and predictable performance as their on-premises network. The high-level APIs provided by the IaaS cloud services provider are used to dereference various low-level details of underlying network infrastructure like physical computing, resources, location, data partitioning, scaling, security, backup and so on.

In a cloud environment, customer data and its processing is typically hosted by server and host machines provided as part of the cloud service provider's infrastructure and the infrastructure could be shared between various customers. As a result, security is of utmost concern to both customers and to the cloud service provider. To facilitate this, IaaS providers may create secure environments by providing several different and completely separated realms with strict security boundaries such that data from one realms cannot leak into or cross over into another realms. Generally, the systems in a realm are exclusive for a certain set of users and not available to other users. Because of the security boundaries, the systems in these realms have to be administered (e.g., to make configuration changes, to push system updates) in an isolated manner to prevent cross-realm data leaks.

While these isolated realm systems enable privacy and security, they pose a challenge to cloud service providers tasked with keeping each separate realm updated and maintained.

BRIEF SUMMARY

The present disclosure describes techniques for accessing and interacting with multiple separate secure realms simultaneously while maintaining security boundaries. In certain embodiments, a single application, such as a browser, is used to access and interact with the multiple separate secure realms. Various inventive embodiments are described herein, including methods, systems, non-transitory computer-readable storage media storing programs, code, or instructions executable by one or more processors, and the like.

In certain embodiments, a client device application (e.g., web browser) can access and interact with multiple secure systems at the same time while maintaining data security boundaries between the systems. For example, a web browser can engage in an isolated session with a realm, such that session data and security data from that session is protected and not shared with other browser sessions. As a result, a user (e.g., cloud services operator) can initiate sessions with multiple secure realms without creating a security breach, and can provide maintenance services and updates to multiple realms in an efficient manner. For example, a user can first login to each system, and then updates can be provided to multiple systems at the same time or consecutively without requiring manual user input (e.g., manual logins) at each step.

In certain embodiments, a method includes establishing a first session between an application and a first realm after successful authentication of a user for the first realm, storing, by the application, a first set of one or more keys for the first session in a first isolated data store, while the first session is active between the application and the first realm, establishing a second session between the application and a second realm after successful authentication of the user for the second realm, wherein the first realm includes a first set of data centers, wherein the second realm includes a second set of data centers, and wherein data is not shared between the first realm and the second realm, storing, by the application, a second set of one or more keys for the second session in a second isolated data store that is separate from the first isolated data store, wherein the application isolates the first session with the first realm from the second session with the second realm so that information is not shared between the first realm and the second realm, executing, by the application, instructions that cause a first request to be generated and communicated to the first realm via the first session, the first request requesting a first task to be performed in the first realm, wherein the instructions include: sending, to the first realm via the first session, using one or more keys from the first set of one or more keys and without re-authentication of the user, the first request for the first task to be performed, and receiving, from the first realm via the first session, a particular status code generated due to execution of the first task by the first realm, and responsive to receiving the particular status code from the first realm, executing, by the application, instructions that cause a second request to be generated and communicated to the second realm via the second session, the second request requesting a second task to be performed in the second realm, wherein the instructions include: sending, to the second realm via the second session, using one or more keys from the second set of one or more keys and without re-authentication of the user, a second request for the second task to be performed.

In certain embodiments, the first task is for a first tenancy in the first realm and the second task is for a second tenancy in the second realm.

In certain embodiments, the first tenancy is a tenancy for a first customer, and wherein the second tenancy is a tenancy for a second customer.

In certain embodiments, the first tenancy includes a first compute, a first memory, and first networking resources provided in the first realm by a cloud services provider, and wherein the second tenancy includes a second compute, a second memory, and second networking resources provided in the second realm by the cloud services provider.

In certain embodiments, the first task comprises installing a set of one or more updates at the first realm, and wherein the second task comprises installing the set of one or more updates at the second realm.

In certain embodiments, the particular status code indicates that the first task has completed successfully.

In certain embodiments, the particular status code indicates that the first task was initiated successfully and is currently in progress.

In certain embodiments, the first realm includes a first set of data centers and the second realm includes a second set of data centers In certain embodiments, a method includes establishing a first session between an application and a first realm after successful authentication of a user for the first realm, storing, by the application, a first set of one or more keys for the first session in a first isolated data store, while the first session is active between the application and the first realm, establishing a second session between the application and a second realm after successful authentication of the user for the second realm, storing, by the application, a second set of one or more keys for the second session in a second isolated data store that is separate from the first isolated data store, wherein the application isolates the first session with the first realm from the second session with the second realm, executing, by the application, instructions that cause a first request to be generated and communicated to the first realm via the first session, the first request requesting a first task to be performed in the first realm, wherein the instructions include: sending, to the first realm via the first session, using one or more keys from the first set of one or more keys and without re-authentication of the user, the first request for the first task to be performed, and after sending the first request and before the first task is completed, executing, by the application, instructions that cause a second request to be generated and communicated to the second realm via the second session, the second request requesting a second task to be performed in the second realm, wherein the instructions include: sending, to the second realm via the second session, using one or more keys from the second set of one or more keys and without re-authentication of the user, a second request for the second task to be performed.

In certain embodiments, the application comprises a web browser.

In certain embodiments, establishing the first session comprises: displaying, by the application, a user interface for entering one or more user credentials, and receiving, by the application, the one or more user credentials via the user interface.

In certain embodiments, establishing the first session comprises: generating a first asymmetric key pair including a first private key and a first public key, sending, from the application to a first access management server, the first public key and a first set of one or more user credentials, wherein the first access management server uses the first set of one or more user credentials for authentication, and receiving, by the application from the first access management server, a first security token for the first session, and wherein establishing the second session comprises: generating a second asymmetric key pair including a second private key and a second public key, sending, from the application to a second access management server, the second public key and a second set of one or more user credentials, wherein the second access management server uses the second set of one or more user credentials for authentication, and receiving, by the application from the second access management server, a second security token for the second session.

In certain embodiments, executing the first task for the first realm further comprises: generating a first digital signature for the first request using the first private key, and wherein executing the second task for the second realm further comprises: generating a second digital signature for the second request using the second private key.

In certain embodiments, the first task is for a first tenancy in the first realm, the first tenancy is a tenancy for a first customer, the first tenancy includes a first compute, a first memory, and first networking resources provided in the first realm by a cloud services provider, the second task is for a second tenancy in the second realm, the second tenancy is a tenancy for a second customer, and the second tenancy includes a second compute, a second memory, and second networking resources provided in the second realm by the cloud services provider.

In certain embodiments, the first isolated data store is a first local IndexedDB, and wherein the second isolated data store is a second local IndexedDB.

In certain embodiments, the application comprises a web browser, wherein the web browser stores the first set of one or more keys such that the first set of one or more keys is not extractable, and wherein the web browser stores the second set of one or more keys such that the second set of one or more keys is not extractable.

In certain embodiments, a computer system includes one or more processors and a memory in communication with the one or more processors, the memory configured to store computer-executable instructions, wherein executing the computer-executable instructions causes the one or more processors to perform one or more of the steps of the method described above.

In certain embodiments, a computer-readable storage medium stores computer-executable instructions that, when executed, cause one or more processors of a computer system to perform one or more steps of the method described above.

The foregoing, together with other features and embodiments will become more apparent upon referring to the following specification, claims, and accompanying drawings.

DETAILED DESCRIPTION

Figure 1:
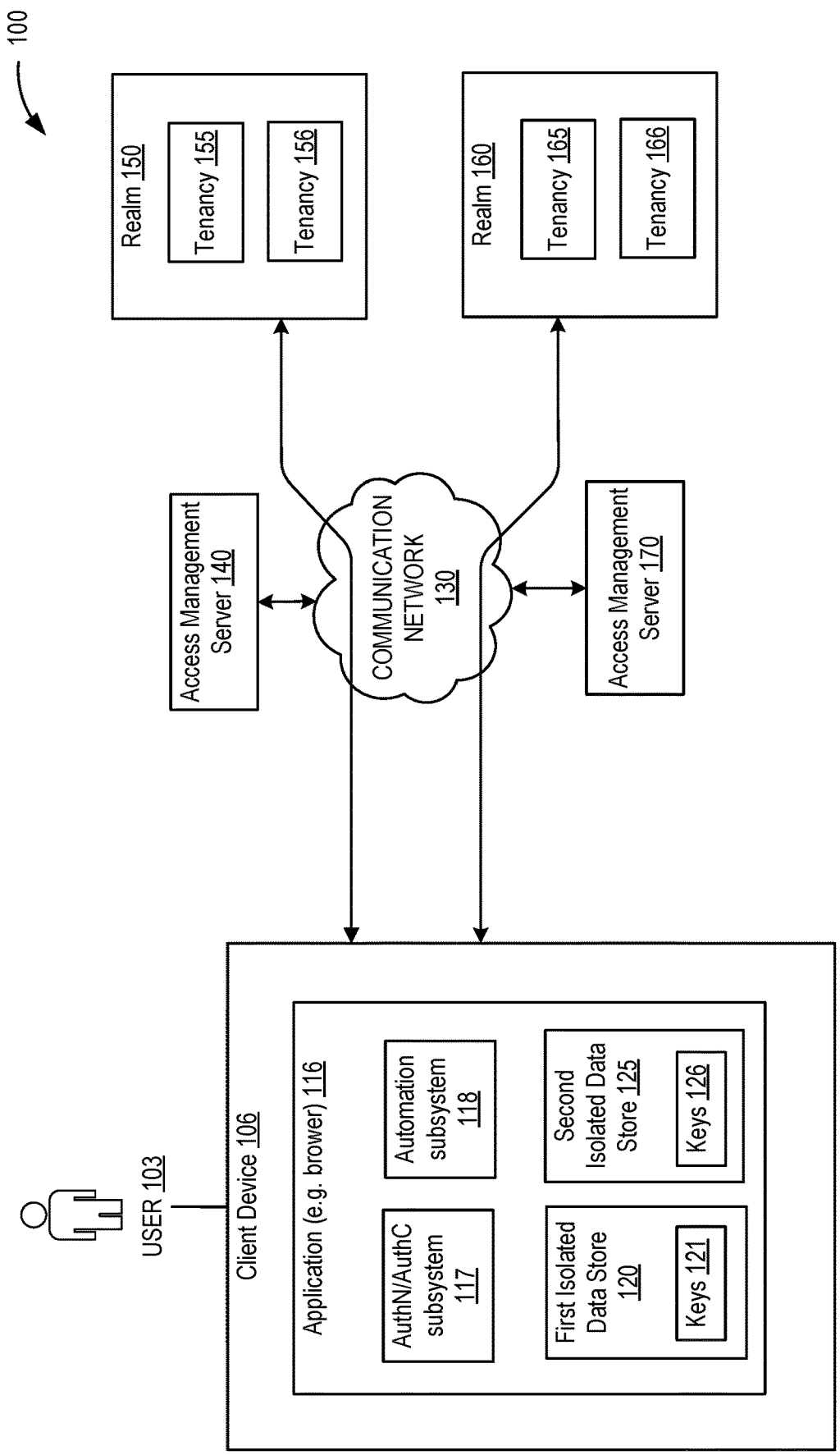
FIG. 1 illustrates an example system for accessing multiple systems simultaneously while maintaining security boundaries, in accordance with one or more embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes techniques for accessing and interacting with multiple separate secure realms simultaneously while maintaining security boundaries. In certain embodiments, a single application, such as a browser, is used to access and interact with the multiple separate secure realms. Various inventive embodiments are described herein, including methods, systems, non-transitory computer-readable storage media storing programs, code, or instructions executable by one or more processors, and the like.

In certain embodiments, a client device application (e.g., web browser) can access and interact with multiple secure systems (e.g., realms) at the same time while maintaining data security boundaries between the systems. For example, a user, such as a system administrator, can use a web browser to establish a first session with a first realm and then interact with the first realm via that first session. Concurrently, the user can, using the same web browser, initiate a second session with a second realm that is separate from the first realm, and then interact with the second realm via the second session.

Maintaining security boundaries can include keeping information related to a first realm private so that it is not shared with a second realm or intermediary service. For example, a web browser may use a first set of security credentials (e.g., credentials used for authentication and authorization purposes) to establish the first session and send task or operation requests to the first realm via the first session. The web browser may use a second set of security credentials (e.g., credentials used for authentication and authorization purposes) to establish the second session and send task or operation requests to the second realm via the second session. The two sessions (which may be displayed in separate tabs or windows) may be configured to not share information with each other. Accordingly, different sets of keys, tokens, and other credentials can be used for communicating through the separate sessions. In certain embodiments, the two sets of realm-specific security credentials are stored by the web browser in a secure and isolated manner such that session data and security data from one session is protected from and not shared with the other session (or other sessions, where multiple sessions are established by the web browser with multiple realms). In addition to realm-specific isolated data stores, in certain embodiments, various credentials and/or session data can be encrypted and/or stored in an manner so that they cannot be extracted. Through these and other techniques, the web browser executed at the client device can prevent the flow of information between realms and thereby maintain security boundaries.

The application (e.g., a web browser) can also execute logic (e.g., via machine-executable code or instructions) for interacting with the different realms and performing operations in the different realms. For example, the web browser may execute instructions where a response received from one realm is used to automatically initiate a certain operation in another realm. As another example, the same single web browser can execute instructions that cause operations to be initiated in two different realms such that the operations overlap in the two realms.

The various features described in this disclosure thus enable, a user (e.g., cloud services operator) to initiate concurrent sessions with multiple realm systems without creating a cross-realm security breach, and can thereby provide maintenance services and updates to multiple systems in an efficient manner. For example, a user can first login to each system, and then updates can be provided to multiple systems at the same time or consecutively without requiring manual user input at each step.

In certain embodiments, the cloud infrastructure provided by a IaaS cloud services provider may be organized and hosted in regions and availability domains. The cloud infrastructure may include components in the physical or substrate network and virtualized components (e.g., virtual networks, compute instances, container, virtual machines, etc.) that are in an overlay network built on top of the physical network components. A region may correspond to a localized geographic area. An availability domain may correspond to one or more data centers located within a region. A region can be composed of one or more availability domains. In such a distributed environment, cloud infrastructure resources are either region-specific, such as a virtual cloud network, or availability domain-specific, such as a compute instance. Traffic between availability domains is usually encrypted. Availability domains are isolated from each other, fault tolerant, and are configured such that they are very unlikely to fail simultaneously. This is achieved by the availability domains not sharing critical infrastructure resources such as power or cooling, and a failure at one availability domain within a region is unlikely to impact the availability of the others within the same region. The availability domains within the same region may be connected to each other by a low latency, high bandwidth network, which makes it possible to provide high-availability connectivity to other networks (e.g., the Internet, customers' and on-premise networks, etc.) and to build replicated systems in multiple availability domains for both high-availability and disaster recovery. As the infrastructure provided by the IaaS provider grows, more regions and availability domains may be added with additional capacity.

Regions are generally independent of other regions and can be separated by vast distances, for example, across countries or even continents. For example, a first region may be in Australia, another one in Japan, yet another one in India, and the like. Generally, an application is deployed in a region where it is most heavily used, because using nearby resources is faster than using distant resources. Applications can also be deployed in different regions for various reasons, such as to mitigate the risk of region-wide events such as large weather systems or earthquakes, to meet varying requirements for legal jurisdictions, tax domains, and other business or social criteria, and the like. Each regions may provide a set of core infrastructure services, such as, compute services (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources (e.g., audit, identity and access management, monitoring, notifications, tagging, work requests, etc.).

In certain embodiments, regions are grouped into realms. A realm maybe a logical collection of regions that share entities. Realms are isolated from each other and do not share any data. A customer's tenancy (or account with the cloud services provider) exists in a single realm and can access regions that belong to that realm. A customer cannot access regions that are not in the realm where the customer's tenancy exists. An IaaS cloud provider can provide multiple realms, each realm catered to a particular set of users. Examples of realms include a commercial realm, a realm for a specific country, a realm for a government, a realm for a specific branch of a government or military, and the like. For example, the government realm may be catered for a specific government and may have a heightened level of security than a commercial realm.

FIG. 1 is a simplified block diagram of a system 100 incorporating an exemplary embodiment. As illustrated, the system 100 includes a client device 106, a communication network 130, one or more access management servers 140 and 170, and one or more realms 150 and 160.

Communication network 130 facilitates communications between the various systems depicted in FIG. 1. Communication network 130 can be of various types and can include one or more communication networks. Examples of communication network 130 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. In general, communication network 130 may include any infrastructure that facilitates communications between the various systems depicted in FIG. 1.

The user 103 may operate the client device 106 (e.g., via an application 116) to access the realms 150 and 160. The realms 150 and 160 may each comprise one or more enterprise computer networks. Each realm may provide a user access to various resources stored and/or managed by the realm. Additionally, the user 103 may use the client device 106 to manage (e.g., provide updates) the realms 150 and 160. According to the teachings described in this disclosure, a single application executed by the client device 106 can be used to access both the realm 150 and the realm 160 simultaneously while maintaining data security and separation between the realm 150 and the realm 160.

The client device 106 may be a portable handheld device (e.g., an iPhone®, cellular telephone, an iPad®, computing tablet, a personal digital assistant (PDA)) or a wearable device (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the communication network 130 and/or the Internet.

The client device 105 may be configured to operate a client application 116 such as a web browser for accessing information on the Internet, a proprietary client application (e.g., Oracle Forms), or some other application, which may be used by a user 103 of the client device 106 to interact with realm 150, realm 160, access management server 140, and/or access management server 170. Using application 116, user 103 may request access to one or more resources, engage in authentication, modify server configurations, or interact with the realms 150 and/or 160 and access management servers 140 and/or 170 for any other suitable purpose.

In certain embodiments, the application 106 can include multiple subsystems. The application 106 can include an AuthN/AuthC subsystem 117 for engaging in authentication and authorization related processing. For example, during an authentication process, the AuthN/AuthC subsystem 117 can present an interface (e.g., a GUI) so that the user 103 can enter credentials, and then the AuthN/AuthC subsystem 117 can cause the client device 106 to communicate with the access management servers 140 and/or 170 to provide the credentials. The an AuthN/AuthC subsystem 117 can generate keys pairs, provide keys to an access management server, digitally sign login messages and/or future communication messages with realms, and/or perform any other suitable session-related communication.

In an example embodiment, the user 103 may request access to a protected resource stored on the first realm 150 by entering a uniform resource locator (URL) or other data identifying the requested resource into an application user interface (UI). In certain embodiments, the access management server 140 is configured to intercept the request from the application, authenticate the user 103 attempting to access the protected resource and upon successful authentication, create a session so that the user 103 can access to the protected resource at the realm 150.

The application 116 can be configured to use Holder of Key functionality for communications with the access management servers 140 and 170 and/or the realms 150 and 160. In one example, during authentication, the application 116 (e.g., via the AuthN/AuthC subsystem 117) can generate and/or provide a public key from an asymmetric key pair to an access management server 140 or 150. As a result, the access management server 140 or 150 can include the client device's public key in a subsequently generated security token. Subsequently, during communications with a realm 150 or 160, the application 116 can digitally sign messages using the corresponding private key. The realm 150 or 160 can then verify the authenticity of the message by validating the digital signature with the public key. Additionally, messages sent from the application 116 to a realm can be encrypted using a realm's public key (e.g., as indicated in a realm certificate).

In some embodiments, a user 103 can access both the realm 150 and the realm 160, simultaneously or at different times. For example, the user 103 may be a cloud services administrator or operator with credentials to two or more different systems, and the application 116 may be configured to access two or more systems simultaneously without creating security risks for either system.

This can be accomplished by isolating, within the application 116, different access sessions and related data. As an example, a first session for interacting with the realm 150 and second session for interacting with the realm 160 can be isolated from one another. In some embodiments, the application 116 can include separated storage areas for isolating session data. For example, the first isolated data store 120 can store information regarding the first realm 150, and the second isolated data store 125 can store information regarding the second realm 160. By isolating the sessions, the application 116 can prevent information from being shared between the realm 150 and the realm 160.

The isolated data stores can be implemented using IndexedDB, which is a JavaScript application programming interface (API) provided by web browsers for managing a database of objects. JavaScript in a first domain is not able to access resources stored in an IndexedDB of a website for another domain.

The session data stored in the first isolated data store 120 and the second isolated data store 140 can include any information communicated between the client device 106 and realms 150 and 160. For example, the first isolated data store 120 can store one or more keys 121. The keys 121 can include any suitable type of encryption key, such as symmetric session keys and asymmetric private keys generated for a specific session with a specific realm. The first isolated data store 120 can also store one or more security tokens (e.g., in the form of browser cookies), a session identifier, user information, and/or any other suitable data. Similarly, the second isolated data store 140 can also include keys 126, one or more security tokens (e.g., in the form of browser cookies), a session identifier, user information, and/or any other suitable data.

In certain embodiments, any suitable number of additional isolated and/or indexed data stores to be included for interactions with additional realms. For example, the application 116 can include a third isolated data store and a fourth isolated data store for storing information and keys for interactions with a third realm and a fourth realm.

In certain embodiments, the application 116 may call one or more Web Crypto APIs to encrypt the data (e.g., keys 121 and 126) that is stored in data stores 120 and 125, and/or to perform any other suitable cryptographic functions. Web Crypto API is an interface that can increase the security of web applications by allowing the web applications to perform cryptographic functions.

The automation subsystem 118 can execute logic (e.g., via execution of code or instructions by one or more processors) to automate certain operations. For example, these automated operations may include interactions with one or more realms. For example, the automation subsystem 118 may be configured to, based upon a response received from one realm, automatically initiate a certain operation in a second realm with which the application 116 has an established session. For example, after sessions have been successfully established with realms 150 and 160, the user 103 can program the automation subsystem 118 start an "update" task (e.g., a software update or configuration update task) for the first realm 150. The automation subsystem 118 may be further configured to monitor one or more responses received from the first realm 150 as a result of execution of the update task, and to programmatically and automatically initiate a "start update" task for the second realm 160 when a particular response (e.g., a success status code) is received from the first realm 150. As another example, the automation subsystem 118 may be programmed to cause operations or tasks to be initiated in two different realms (e.g., in realm 150 and in realm 160) such that the operations overlap in time. In this manner, the automation subsystem 118 may be programmed to automate various tasks and operations performed in the first realm 150 and in the second realm 160.

As described above, a cloud infrastructure provided by a IaaS cloud services provider may be divided into different organizational layers. One or more data centers can be grouped into an availability domain. One or more availability domains can be grouped into a region, for example, based on a geographic area. In certain embodiments, a realm may comprise a collection of regions that share entities.

Accordingly, a realm, such as the first realm 150 or the second realm 160, can comprise a domain of a cloud services system (also referred to as an enterprise computer network) that may be used to meet the computing needs of one or more organizations, such as businesses, universities, government organizations, or the like. Each realm in a cloud services system can include infrastructure distributed across different data centers that are geographically collocated or dispersed, but that belong to the same multi data center deployment. For example, first realm 150 can include a first set of data centers, and the second realm 160 can include a second set of data centers. Each data center within a realm may include applications and web gates, along with other infrastructure, such as identity stores, databases, or the like. Various realm resources may be managed and/or stored by the different data centers. For example, a first resource may be stored and managed by a first data center within the realm 150 and a second resource may be stored and managed by a second data center within the realm 160. Resources may include any item managed and/or stored by the data centers and available for access by one or more users, such as an application, a document, a file, and/or the like.

As an example, a realm, such as the first realm 150 or the second realm 160, can be composed of one or more data centers that include one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. A realm can include one or more virtual machines running virtual operating systems, or other computing architectures involving virtualization. One or more flexible pools of logical storage devices can be virtualized to maintain virtual storage devices for the realm. Virtual networks can be controlled by a realm using software defined networking. In some embodiments, a realm may also include infrastructure resources for providing the resources used to provide various services to customers of a cloud infrastructure system. In one embodiment, infrastructure resources may include pre-integrated and optimized combinations of hardware, such as servers, storage, and networking resources to execute the services provided by a PaaS platform and a SaaS platform.

In some embodiments, resources in a realm, such as the first realm 150 or the second realm 160, may be shared by multiple users and dynamically re-allocated per demand. Additionally, resources may be allocated to users in different time zones. For example, a realm may enable a first set of users in a first time zone to utilize resources of the cloud infrastructure system for a specified number of hours and then enable the re-allocation of the same resources to another set of users located in a different time zone, thereby maximizing the utilization of resources.

A realm can interact with the client device 106 to provide the user 103 access one or more resources governed by the realm, which may include any item managed and/or stored by a computing system, such as applications, a document, a file, electronic content, a web page, a computing resource, and/or the like. Additionally, the user 103 can update, provision, or otherwise modify configurations at the realm. Compute resources, storage resources, networking resources, etc., can all be included in a user's tenancy at the realm (e.g., tenancy 155 at realm 150).

The realm 150 can comprise a first domain of a cloud services system, and the realm 160 can comprise a second domain of a cloud services system. In some embodiments, the realms 150 and 160 can be separate systems that do not share resources or information, even if the realms 150 and 160 are provided by the same cloud services provider. Additionally, the realms 150 and 160 may have different security levels and different security protocols.

A tenancy 155 and a tenancy 156 in the first realm 150 may utilize resources at the first realm 150, but may not utilize resources at the second realm 160 or otherwise allow access to the second realm 160. Similarly, a tenancy 165 and a tenancy 166 in the second realm 160 may utilize resources at the second realm 160, but may not utilize resources at the first realm 150 or otherwise allow access to the second realm 160.

Accordingly, in a situation where a single user has established both a first tenancy at the first realm 150 and a second tenancy at the second realm 160, the user may have two different sets of access credentials, a first set of access credentials for logging into the first realm 150 and a second set of access credentials for logging into the second realm 160. Similarly, a cloud services operator performing maintenance on various cloud infrastructure domains may have different sets of access credentials for accessing different realms.

In certain embodiments, a client application can simultaneously set up sessions with two or more different domains in a secure manner that does not share information between the different domains. The description herein primarily uses the example of realms. However, certain embodiments can also apply to any other suitable domain. For example, in some embodiments, a client application can access two or more different networks, two or more different isolated systems, two or more different server computers, two or more different user accounts, or two or more different platforms, any of which can be isolated from one another. The client application can have different sets of access credentials for each domain, the client application can sign in (e.g., login or single sign-on) to each domain separately, the client application can store information for each domain's communication session in separated isolated storage areas, and the client application can access the domains simultaneously without sharing information between the domains, without creating an information pathway between the domains, and without otherwise creating security vulnerabilities.

A realm may be accessible to user 103 upon successful authentication of credential information for user 103. Before a realm is accessible to user 103 at the client device 106, user 103 may be authenticated for an access session by an access management server.

In some embodiments, each realm can utilize a different access management server for user authentication. For example, a first access management server 140 can be associated with the first realm 150, and a second access management server 140 can be associated with the second realm 160. In other embodiments, one access management server can provide authentication services for two or more realms. For example, the access management server 140 can be associated with both the first realm 150 and the second realm 160.

Certain embodiments allow the access management server 140 to be incorporated as a part of the realm 150, or to be implemented by a separate computing system. The access management server 140 may perform various session related functions for managing access to the realm 150. For example, the access manager server 140 may perform authentication and/or authorization of the client device 106 when a user attempts to access the realm 150. Authentication is the process of proving that a user is who the user claims to be. Authorization is the process of determining if a user has a right to access a requested resource, modify settings and configurations of the realm 150, and/or perform other tasks.

The access management server 140 can be, for example, an identity access management (IAM) server or an Oracle Access Management (OAM) server. Access management server 140 can be a computer, including a processor and a memory. The access management server 140 can store an application that will be used for login. The application that is used for determining whether a user can log into an application can be known as a login application, server application, authentication application, access manager (AM) application, or an identity access management (IAM) application.

The access management server 140 may be implemented by one or more computing systems that execute computer-readable instructions (e.g., code, program) to implement the server. The access management server 140 can include various subsystems including a session engine and an authorization engine. These systems and subsystems may be implemented using software (e.g., code, instructions, program) executed by one or more processing units (e.g., processors, cores) of a computing system, hardware, or combinations thereof. The software may be stored on a non-transitory storage medium (e.g., on a memory device).

A session engine at the access management server 140 can manage authentication of a user and manage sessions created to enable access for the user. Authentication is performed when a session is being established for a user between the web browser and the realm. For example, to authenticate a user 103, the session engine may present a client device 106 with a request for authentication credentials in the form of a challenge (e.g., via the application 116). The request may include information (e.g., a URL) for a web page or a user interface (e.g., a web page, portal, or dashboard) to receive credential information (e.g., user name/password, or the like). The access management server 140 can then determine authentication of user 103 based on received credentials (e.g., by validating the credentials against those stored in an identity data store, or by other suitable authentication scheme). In certain embodiments, a session may be established only after successful authentication.

Authentication policies may specify the authentication methodology to be used for authenticating the user 103. The policies define the way in which realm 150 and/or resource access is to be protected (e.g., type of encryption, or the like). In some embodiments, any suitable credential type can be supported, such as Oracle Access Management (OAM) protected resources, federated applications/resources, and form-fill applications. Examples of credential types may include a Smartcard/Proximity card, a token, a public key infrastructure (PKI), a Windows Logon, a lightweight directory access protocol (LDAP) logon, a biometric input, or the like. For OAM protected resources and servers, user requests can be authenticated and then directed to URLs associated with the requested resources and servers. For Federated Applications, links to federated partners and resources can be provided, including business to business (B2B) partner applications and SaaS applications. For form fill applications, templates can be used to identify fields of application web pages through which credentials can be submitted.

Once successfully authenticated, the access management server 140 can initiate a session. A session can allow communication between two endpoints (e.g., between a browser and a server within realm 150, for a user). Initiating a session can include creating and providing a security token to the application 116 at the client device 106. The security token can take any suitable form of any suitable protocol, such as a Security Assertion Markup Language (SAML) assertion. The security token can include a digital signature which can be generated using a private key associated with the access management server 140, and which can later be validated by other systems (e.g., the realm 150) using a corresponding public key.

In some embodiments, the security token can include a public key provided by the application 116 at the client device 106. As a result, when the application 116 sends a message to the realm 150, the application 116 can provide the security token along with a digital signature generated using the client device private key. This can enable the realm 150 to verify that the application 116 is authorized based on the security token information and verify the authenticity of the message by validating the application's digital signature. Additionally, the realm 150 can encrypt response messages using the client device's public key.

Additionally, the access management server 140 can store a copy of data (session information) for an established session (e.g., information about the client device 106, authorizations, method of authentication, security token, client public key, etc.) in a session data store.

Although a user 103 may be authenticated to access the realm 150, each user may have different rights to access different resources and perform different tasks. Accordingly, in some embodiments, a level of access for the user 103 is determined. The access management server 140 may utilize an authorization engine to determine the scope of authentication. An authorization engine can determine resources and actions that are protected and, based on authentication sessions, can determine resources and actions that are permitted and/or restricted for a session (e.g., using information stored in a policies data store). For example, the authorization engine can determine whether the user 103 is permitted to access certain applications, access cloud storage, perform updates, provision resources, or modify the realm 150. The access management server 140 may indicate in the security token whether access to a certain resource and/or performing a certain task is permitted for the user 103.

Authorization comes into play when the user is trying to perform some operation (e.g., access, read, write to, delete, etc.) on a resource. The access management server 140 can check if the user is authorized to perform the operation on the resource. Typically, once a session has been set up, the user does not have to be authenticated for each subsequent request, only the authorization check is performed. However, in certain situations the access management for a realm may be set up such that authentication may be needed for each request in addition to an authorization check.

The access management server 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, access management server 140 is coupled to, or includes, one or more data stores for storing data such as an identity data store, a session data store, and a policies data store. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

A session data store at the access management server 140 can store session information for each created access session. Session information may include, without restriction, 1) authenticated user subject information such as user identity information (e.g., user identifier, user domain name, user group user identification (GUID), and group membership for user); 2) list of partners accessed in session; 3) Internet protocol (IP) address of a client; 4) authentication level; 5) authentication scheme; 6) authentication timestamp; 7) application domain information for one or more resources that are accessed; 8) a public key associated with the client device 106; and 9) information describing a security token provided to the client device 106. Additionally, some or all of this info can be included in a security token, according to some embodiments.

In some embodiments, the access management server 140 may use one or more policies stored in the policies data store ("policies") to control access to the realm 150 and resources. Policies may include an authentication policy that specifies the authentication methodology to be used for authenticating a certain user. Policies may include an access policy that defines the way in which realm 150 access and/or resource access is to be protected (e.g., type of encryption, or the like). Policies may include an authorization policy that specifies the conditions under which a user or group of users has access to a resource. For example, an administrator may only authorize certain users within a group to access particular resources and/or perform certain tasks.

An identity data store at the access management server 140 can store user identity information and/or security data for users. For example, login credentials (e.g., username and password), known devices and IP addresses, and/or other personal information can be stored. This information can be utilized during authentication, for example to compare against user-provided credentials.

As mentioned above, system 100 can include also include another access management server 170, similar to the access management server 140, but for controlling access and authentication for the second realm 160. After authenticating at the access management server 140 to gain access to the first realm 150, the user 103 may need to authenticate separately at the access management server 170 in order to gain access to the second realm 160.

Certain embodiments allow any suitable number of additional realms and/or access management servers to be included in the system 100 (e.g., a third realm, a fourth realm, etc.). One or more of the realms can include sensitive data, and can be private and secured from access except by approved users (e.g., users associated with a certain enterprise).

As mentioned above, in some embodiments, while the second realm 160 can be similar to the first realm 150, the realms can be separate systems. For example, the realms 150 and 160 may not share information or processes. The realms 150 and 160 may be provided for usage by different entities, and those entities may desire that their data and functions remain private from one another.

In one example, services may be provided under a public cloud model in which the realm 150 and/or the realm 160 are owned by an organization selling cloud services (e.g., owned by Oracle) and the services are made available to the general public or different industry enterprises. As another example, services may be provided under a private cloud model in which the realm 150 and/or the realm 160 are operated solely for a single organization and may provide services for one or more entities within the organization. The cloud services may also be provided under a community cloud model in which the realm 150 and/or the realm 160 and the services provided by the realm 150 and/or the realm 160 are shared by several organizations in a related community. The cloud services may also be provided under a hybrid cloud model, which is a combination of two or more different models.

In one example, both the realm 150 and the realm 160 are provided and administered by the same cloud services provider. A realm can have multiple tenancies, each tenancy corresponding to a customer. Accordingly, realm 150 and realm 160 can host different tenancies corresponding to different customers. For example, a first customer (e.g., a first enterprise) may have a tenancy in realm 150, and a second customer (e.g. a second enterprise) may have tenancy in realm 160. In certain embodiments, even with separate tenancies and separate realms, a cloud services administrator may manage and maintain multiple tenancies and/or realms. Accordingly, in some embodiments, a cloud services administrator may have login credentials for accessing multiple realms (e.g., a first set of credentials for the first realm 150 and a second set of credentials for the second realm 160), but the administrator may access the realms separately so as to protect the privacy and security of the realms.

As discussed above, the application 116 may be able to access (e.g., login to) both realms 150 and 160 simultaneously while maintaining privacy and security boundaries. This can be accomplished using isolated sessions so that information, credentials, and access are stored securely and not shared between sessions.

In some embodiments, instead of physically separate servers and systems, the realms 150 and 160 can represent separate domains of any other suitable sort (e.g., virtually separated portions of a single server or system).

Figure 2:
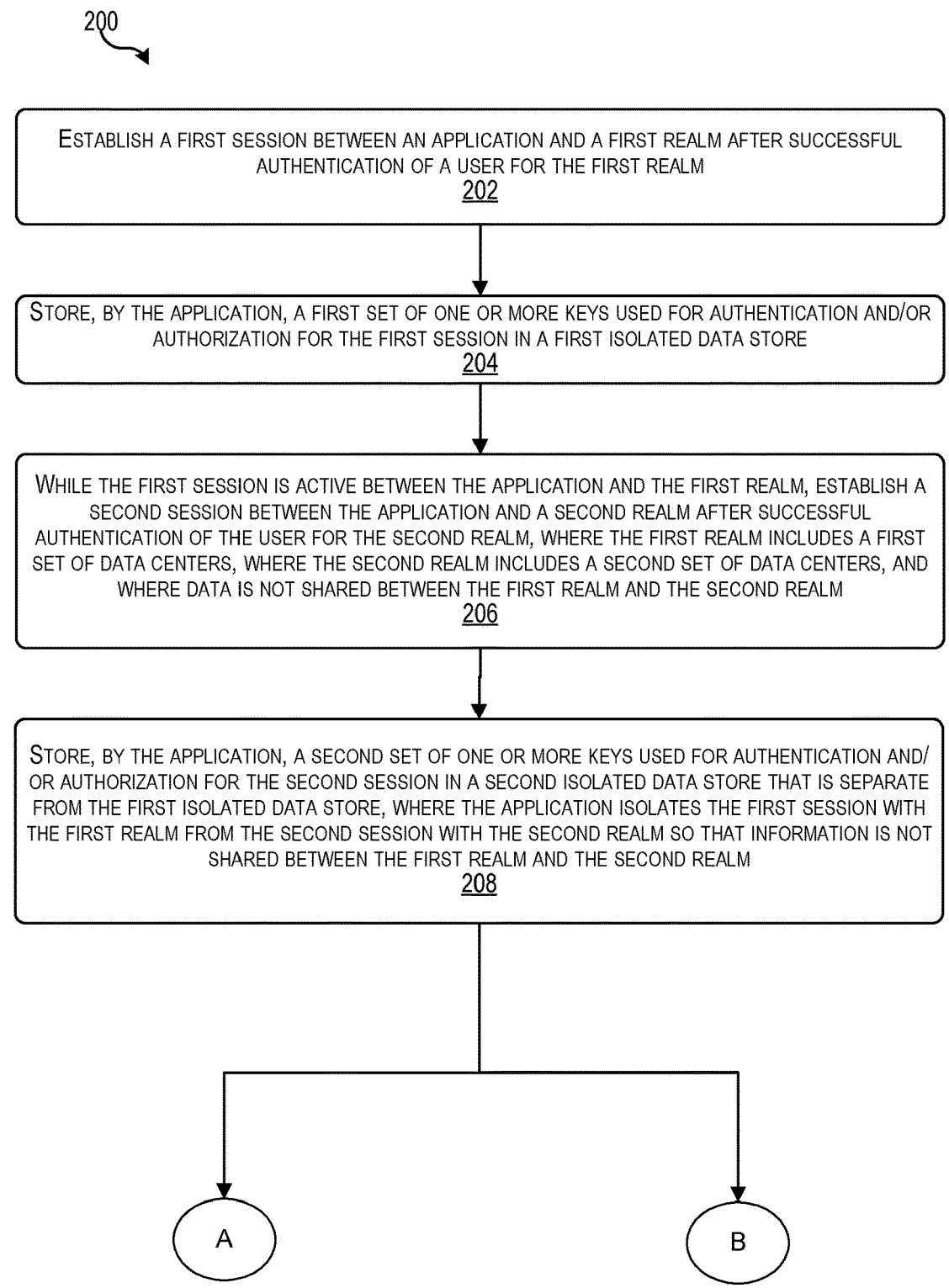
FIG. 2 illustrates an example flow for accessing multiple systems simultaneously while maintaining security boundaries, in accordance with one or more embodiments.

FIG. 2 illustrates an example flowchart 200 depicting a process for accessing multiple realms while maintaining security boundaries, in accordance with one or more embodiments. The processing depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the processing may be performed in some different order or some steps may also be performed in parallel. The operations of the flow can be implemented as hardware circuitry and/or stored as computer-readable instructions on a non-transitory computer-readable medium of a computer system, such as the client device 106 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

At 202, a first session can be established between an application 116 at a client device 106 and a first realm 150 after successful authentication of a client device user for the first realm 150. The first realm 150 can include a first set of data centers and/or any other suitable components of a cloud infrastructure system. The session may be established between application 116 and a component (e.g., a server) within first realm 150.

The processing performed in 202 for establishing the first session may include authenticating the user and establishing the session only after the user has been successfully authenticated. Example processes for establishing the first session and authenticating the user are described in more detail below with respect to FIGS. 5 and 6.

At 204, the application 116 at a client device 106 can store a first set of one or more keys used for authentication and/or authorization for the first session. The first set of one or more keys can be stored in a first isolated data store. As described below with respect to FIGS. 5 and 6, the first set one or more keys and/or tokens can be generated and/or obtained by the application 116 during a login process (e.g., as a part of authentication and activating the first session).

Accordingly, the application 116 at a client device 106 can possess tools, such as keys and tokens, for communicating with the first realm 150 through the first session. The session can remain active and the application 116 at a client device 106 can continue to communicate with the first realm 150 even after the additional communication sessions are established with additional realms. Meanwhile, the application 116 can isolate communications with the first realm 150 from other parts of the application 116 and from other communication sessions with other realms by securely storing session data for the first session in an isolated data store separate from session data of other sessions.

At 206, while the first session is still active between the application 116 and the first realm 150, the application 116 at the client device 106 can establish a second session between the application 116 and a second realm 160 after successful authentication of the user for the second realm 160. The second realm 160 can include a second set of data centers and/or any other suitable components of a cloud infrastructure system. The first realm 150 and the second realm 160 may be separate. For example, the first realm 150 and the second realm 160 may not share data centers and/or may not share information. In some embodiments, the first realm 150 and the second realm 160 may have different security levels and security protocols, different tenancies for different users, and may be separate cloud infrastructure systems (e.g., even if provided and maintained by the same cloud services provider).

At 208, the application 116 at the client device 106 can store a second set of one or more keys used for authentication and/or authorization for the second session. The second set of one or more keys can be stored in a second isolated data store that is separate from the first isolated data store. The application 116 at the client device 106 can isolate the first session with the first realm 150 from the second session with the second realm 160 so that information is not shared between the first realm 150 and the second realm 160.

Typically, different realms such as the first realm 150 and the second realm 160 can only be accessed one at a time. If accessed simultaneously, the application 116 at the client device 106 can create a path for data sharing between the first realm 150 and the second realm 160 that may violate security specifications for the first realm 150 and/or the second realm 160. In contrast, certain embodiments herein enable the application 116 at the client device 106 to have simultaneous active sessions for accessing the first realm 150 and the second realm 160 without sharing information between the realms. This can be achieved by, for example, isolating keys, tokens, and session information for each realm in an isolated data store at the application 116 and otherwise keeping the sessions isolated and private (e.g., using indexedDB storage and/or Holder-of-Key technology).

With both the first session and second session established and concurrently active, and the application 116 storing (concurrently and separately) tools, such as tokens and keys, for communicating with each realm, the method can continue by performing tasks at each realm. Certain embodiments allow processing steps for performing tasks at different realms can take place in various manners. Bubbles A and B shown after box 208 in FIG. 2 represent two different method flows for performing tasks at the realms. Example processing steps for performing tasks corresponding to bubble A are described below with respect to FIG. 3, and example processing steps for performing tasks corresponding to bubble A are described below with respect to FIG. 4.

In some embodiments, each subsequent task at each realm can be performed without requiring the user to re-authenticate. As a result, the user can program the application 116 to automate each of the following steps, such that manual user input is no longer needed for performing any of the following steps illustrated in FIGS. 3 and 4.

Figure 3:
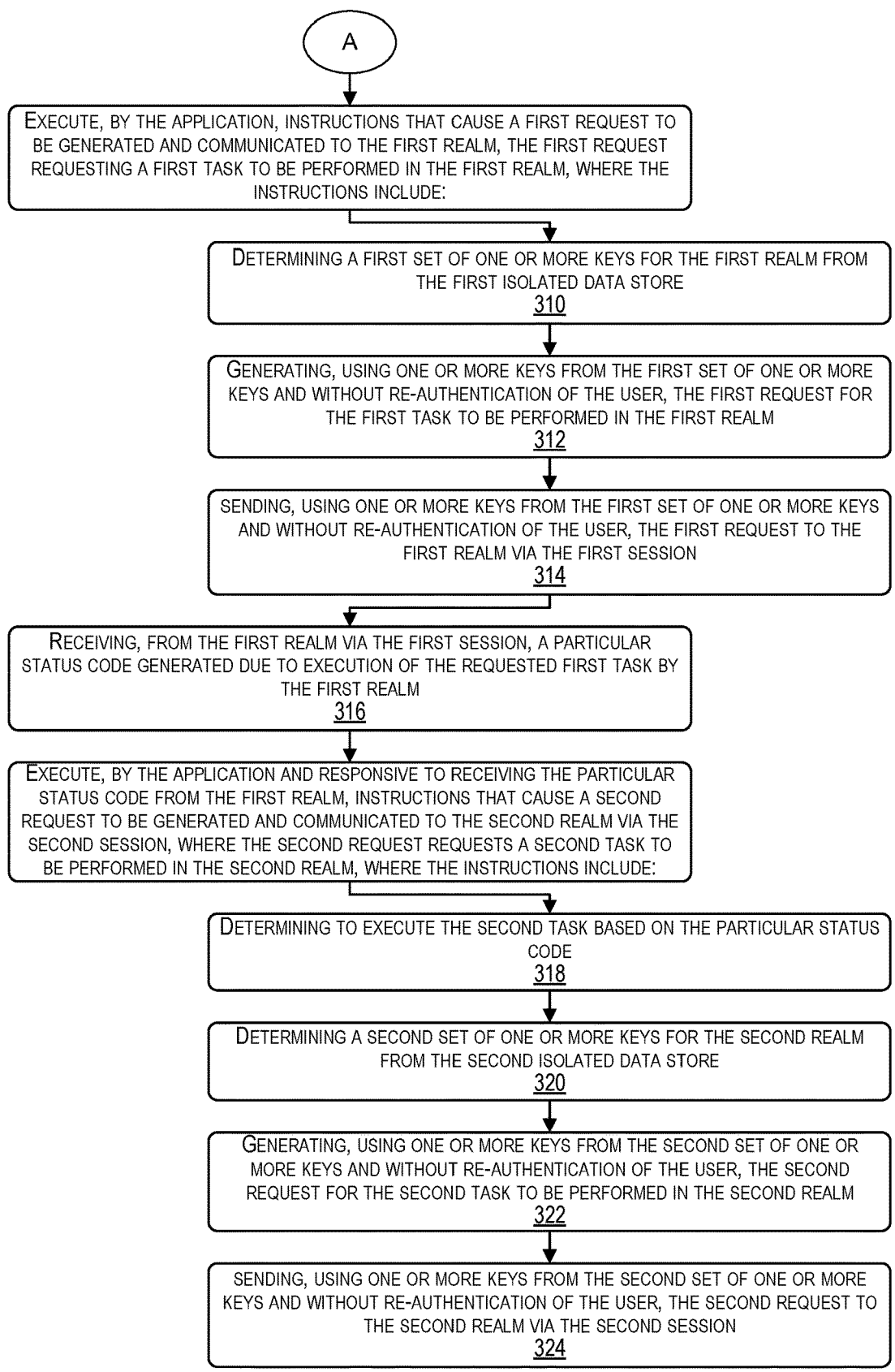
FIG. 3 illustrates an example flow for automated updates across multiple systems, in accordance with one or more embodiments.

FIG. 3 illustrates an example flow for automated updates across multiple systems, in accordance with one or more embodiments. The operations of the flow can be implemented as hardware circuitry and/or stored as computer-readable instructions on a non-transitory computer-readable medium of a computer system, such as the client device 106 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

After establishing two sessions with two realms as described above, the application 116 can execute instructions to interact with the realms in any suitable manner. For example, the application 116 may send requests to each realm requesting that certain tasks be performed at each realm. The application 116 can request any suitable task to be performed, such as installing a software update patch, updating configurations at a realm, provisioning resources at a realm, accessing or utilizing a resource at a realm, modifying a tenancy at a realm, etc.

Accordingly, after bubble A (resuming the process described in FIG. 2), the application 116 continues the process by executing instructions that cause a first request to be generated and communicated to the first realm 150. The first request can be a message requesting that a first task be performed in the first realm 150. The following steps 310 through 314 describe how the first request is generated and sent.

At 310, the instructions can cause the application 116 at the client device 106 to determine a first set of one or more keys for the first realm 150. For example, the application 116 can access the first isolated data store where the first set of one or more keys are stored so that the keys can be retrieved and/or utilized for the request.

At 312, the instructions can cause the application 116 at the client device 106 to generate the first request for the first task to be performed in the first realm 150. The request can include any suitable information about a requested task, such as information about updates to install or a resource to access.

The application 116 at the client device 106 can use one or more keys from the first set of one or more keys to generate the request. For example, a first private key associated with the client device 106 for the first session can be used to digitally sign the request, a session key or a public key associated with the first realm 150 (e.g., as obtained from a first realm certificate) can be used to encrypt some or all information in the request message, and/or any other suitable keys can be used to encrypt or digitally sign data for the request. Additionally, a security token can be included in the request and/or a SAML assertion can be generated using a security token. Additional details about tokens and keys used for communications between the application 116 and the realm 150 are described below with respect to FIGS. 5 and 6.

In some embodiments, the first request can be generated and sent without needing to re-authenticate the user, even if time has passed or other activities have taken place since the user's previous authentication for the first realm 150. This can be enabled by securely storing keys, tokens, and/or other session information in an isolated data store so that previous login information can be used at a later time while remaining protected.

At 314, the instructions can cause the application 116 at the client device 106 to send the first request to the first realm 150 via the first session. As mentioned above, generating and sending the first request can be done using one or more keys from the first set of one or more keys and without re-authentication of the user. For example, the request message can be encrypted and/or signed for transmission to the first realm 150.

The first realm 150 can receive the request message and verify the request by, for example, validating digital signatures and/or decrypting encrypted information. The first realm 150 can then perform one or more tasks requested by the application 116. For example, the first realm 150 can install one or more updates or software patches, process information or execute application logic of one or more resources, provision resources, or perform any other suitable task.

At 316, the application 116 at the client device 106 can receive, from the first realm 150 via the first session, a particular status code that was generated at the first realm 150 due to execution of the requested first task by the first realm 150. For example, in some embodiments, the first realm 150 can generate and send one or more status codes before, during, and/or after the first task is performed. The first realm 150 can send a status code indicating that the request was received, a status code indicating that the task has been initiated, a status code indicating that a task is currently being performed (e.g., along with a percentage of completion), a status code indicating that a task is completed, and/or a status code indicating that a task has failed (e.g., along with information about how and why the task failed). In this way, the application 116 at the client device 106 can be in communication with the first realm 150 and be informed about the status of tasks being performed by the first realm 150.

In some embodiments, the status or progress of a first task being performed at the first realm 150 can cause the application 116 at the client device 106 to initiate a second task at the second realm 160. For example, the application 116 at the client device 106 may wait to confirm that updates were installed successfully at the first realm 150 before initiating installation of the same or similar updates at the second realm 160. This can provide the user 103 and/or application 116 an opportunity to modify the updates (or other request details) before occupying processing resources trying to install potentially incorrect or faulty updates at multiple realms.

Accordingly, responsive to receiving the particular status code from the first realm 150, the application 116 at the client device 106 can execute instructions (e.g., a second set of instructions) that cause a second request to be generated and communicated to the second realm 160 via the second session. The second request can be a message requesting that a second task be performed in the second realm 160. The following steps 318 through 324 describe how the second request is generated and sent.

At 318, the instructions can cause the application 116 at the client device 106 to determine to execute the second task based on the particular status code. For example, a status code indicating that the first task is completed, near completion, and/or initiated successfully can cause the application 116 to initiate the second task. In some embodiments, in addition to or instead of checking a status code, the client device 106 can also test or more functions or resources at the first realm 150 to verify that the first realm 150 is operating and configured as intended (e.g., due to successful installation of updates).

At 320, the instructions can cause the application 116 at the client device 106 to determine a second set of one or more keys for the second realm 160. For example, the application 116 can access the second isolated data store where the second set of one or more keys are stored so that the keys can be retrieved and/or utilized for the second request.

At 322, the instructions can cause the application 116 at the client device 106 to generate the second request for the second task to be performed in the second realm 160. The request can include any suitable information about a requested task, such as information about updates to install or a resource to access. In some embodiments, the application 116 can request that the second realm 160 perform a same or similar set of system updates as were performed (or are still being performed) at the first realm 150.

The application 116 at the client device 106 can use one or more keys from the second set of one or more keys to generate the request. For example, a second private key associated with the client device 106 for the second session can be used to digitally sign the request, a second session key or a second public key associated with the second realm 160 can be used to encrypt some or all information in the request message, and/or any other suitable keys can be used to encrypt or digitally sign data for the request. Additionally, a second security token can be included in the request and/or a SAML assertion can be generated using a second security token. Additional details about tokens and keys used for communications between the application 116 and the second realm 160 are described below with respect to FIGS. 5 and 6.

In some embodiments, the second request can be generated and sent without needing to re-authenticate the user, even if time has passed or other activities have taken place since the user's previous authentication for the second realm 160. This can be enabled by securely storing keys, tokens, and/or other session information in an isolated data store so that previous login information can be used at a later time while remaining protected.

At 324, the instructions can cause the application 116 at the client device 106 to send the second request to the second realm 160 via the second session. As mentioned above, generating and sending the second request can be done using one or more keys from the second set of one or more keys and without re-authentication of the user. For example, the request message can be encrypted and/or signed for transmission to the second realm 160.

The second realm 160 can receive the request message and verify the request by, for example, validating digital signatures and/or decrypting encrypted information. The second realm 160 can then perform one or more tasks requested by the application 116. For example, the second realm 160 can install one or more updates or software patches, process information or execute application logic of one or more resources, provision resources, or perform any other suitable task, any of which can be the same or similar tasks as performed at the first realm 150.

Certain embodiments allow the process to continue in this manner for any suitable number of additional tasks and/or realms. For example, the second realm 160 can return a task code which can cause the application 116 to request a third task at a third realm, or a subsequent task back at the first realm 150.

Processes for updating software at a realm typically require an administrative user to manually update each realm individually, as the user typically can only access one realm at a time to maintain secure data separation. This means the user has manually login and logout of each realm in between each round of updates.

Certain embodiments allow an application 116 at a client device 106 to connect multiple realms at the same time through multiple access sessions, while maintaining secure data separation (e.g., via isolated data storage areas and holder of key techniques). Further, the user 103 can then program the application 116 at the client device 106 to update each different realm (e.g., consecutively or at the same time) through a single process. As a result, the user 103 can initially login to each realm and start the update process, and then the application 116 executed by the client device 106 can carry out each round of updates without further user 103 involvement. This means that the user 103 does not need to be present in between each set of updates to logout of the current realm and login to the next realm (e.g., because the application 116 at the client device 106 is already logged in to each realm). Accordingly, a user 103 can cause the process to run overnight while the user 103 sleeps and without requiring the user 103 to regularly check-in.

This software update process is one example of an automated process provided for illustrative purposes. Certain embodiments allow any other suitable tasks to be automated across securely separated but concurrently active access sessions, such as system security and data integrity checks, provisioning or re-distribution of resources, or any other suitable process.

Figure 4:
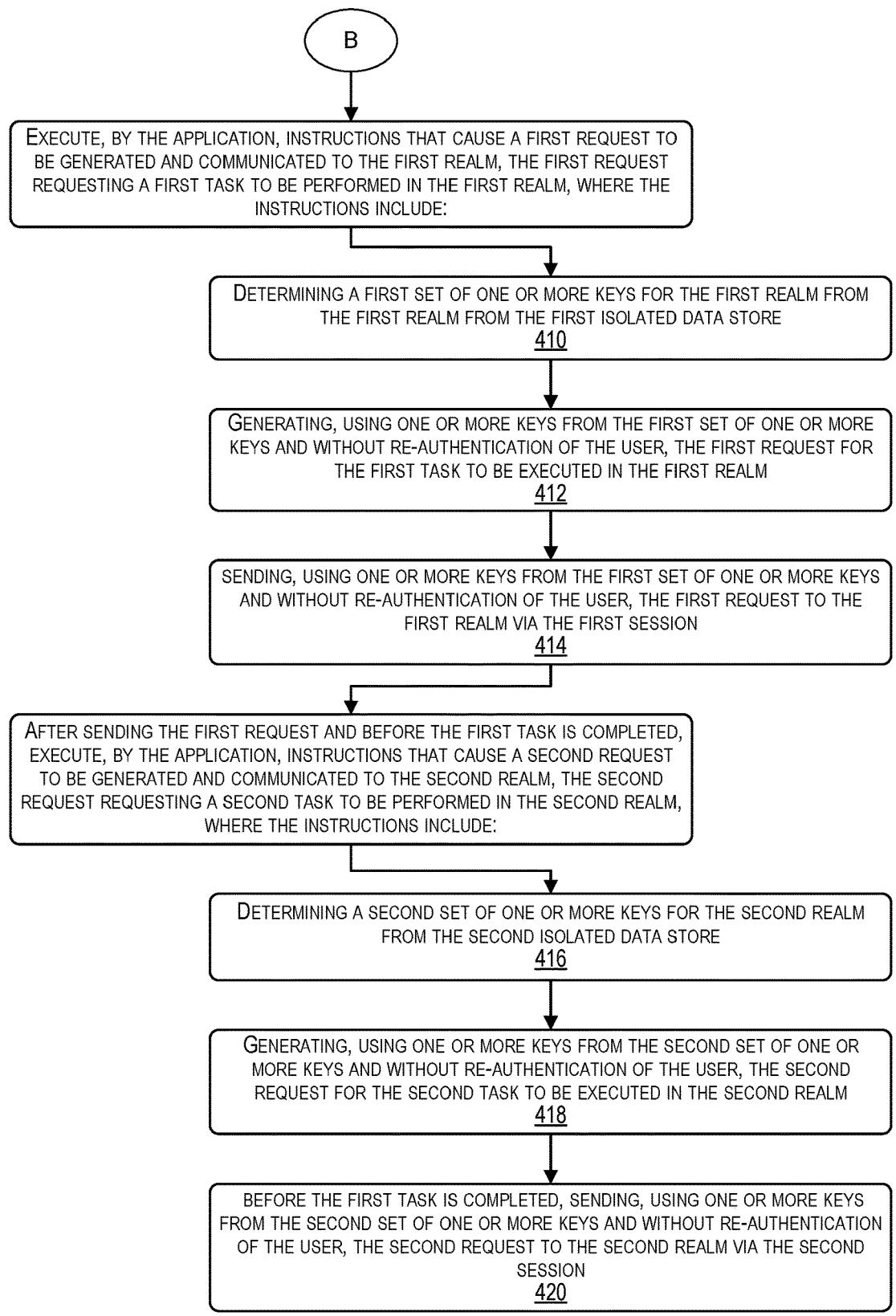
FIG. 4 illustrates another example flow for automated updates across multiple systems, in accordance with one or more embodiments.

FIG. 4 illustrates another example flow for automated updates across multiple systems, in accordance with one or more embodiments. The operations of the flow can be implemented as hardware circuitry and/or stored as computer-readable instructions on a non-transitory computer-readable medium of a computer system, such as the client device 106 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

The process illustrated in FIG. 4 includes several steps that are similar to steps in FIG. 3. However, in the process of FIG. 4, the status codes may be omitted or not utilized. Multiple tasks can be executed at any suitable time without necessarily being prompted by the receipt of a certain task code.

After bubble B (resuming the process described in FIG. 2), the application 116 continues the process by executing instructions that cause a first request to be generated and communicated to the first realm 150. The first request can be a message requesting that a first task be performed in the first realm 150. The following steps 410 through 414 describe how the first request is generated and sent.

At 410, which can be the same as or similar to 310 in FIG. 3, the instructions can cause the application 116 at the client device 106 to determine a first set of one or more keys for the first realm 150. For example, the application 116 can access the first isolated data store where the first set of one or more keys are stored so that the keys can be retrieved and/or utilized for the request.

At 412, which can be the same as or similar to 312 in FIG. 3, the instructions can cause the application 116 at the client device 106 to generate the first request for the first task to be performed in the first realm 150. Without needing to re-authenticate the user, the application 116 at the client device 106 can use one or more keys from the first set of one or more keys to generate the request.

At 414, which can be the same as or similar to 314 in FIG. 3, the instructions can cause the application 116 at the client device 106 to send the first request to the first realm 150 via the first session. As mentioned above, generating and sending the first request can be done using one or more keys from the first set of one or more keys and without re-authentication of the user.

The first realm 150 can receive the request message and verify the request by, for example, validating digital signatures and/or decrypting encrypted information. The first realm 150 can then perform one or more tasks requested by the application 116. For example, the first realm 150 can install one or more updates or software patches, process information or execute application logic of one or more resources, provision resources, or perform any other suitable task.

Certain embodiments allow a second task to be initiated at a second realm 160 at any suitable time. For example, a request for the second task can be transmitted before the first request, at the same time as the first request, immediately after the first request, while the first task is being processed, or after the first task is finished.

As an example, the application 116 can execute instructions that cause a second request to be generated and communicated to the second realm after sending the first request (e.g., in 414) and before the first task is completed at the first realm 150. The second request can request that a second task to be performed in the second realm 160. The following steps 416 through 420 describe how the second request can be generated and sent.

At 416, which can be the same as or similar to 320 in FIG. 3, the instructions can cause the application 116 at the client device 106 to determine a second set of one or more keys for the second realm 160. For example, the application 116 can access the second isolated data store where the second set of one or more keys are stored so that the keys can be retrieved and/or utilized for the second request.

At 418, which can be the same as or similar to 322 in FIG. 3, the instructions can cause the application 116 at the client device 106 to generate the second request for the second task to be performed in the second realm 160. Without needing to re-authenticate the user, the application 116 at the client device 106 can use one or more keys from the second set of one or more keys to generate the request.

At 420, which can be the same as or similar to 324 in FIG. 3, the instructions can cause the application 116 at the client device 106 to send the second request to the second realm 160 via the second session. As mentioned above, generating and sending the second request can be done using one or more keys from the second set of one or more keys and without re-authentication of the user.

The second realm 160 can receive the request message and verify the request by, for example, validating digital signatures and/or decrypting encrypted information. The second realm 160 can then perform one or more tasks requested by the application 116. For example, the second realm 160 can install one or more updates or software patches, process information or execute application logic of one or more resources, provision resources, or perform any other suitable task, any of which can be the same or similar tasks as performed at the first realm 150.

Certain embodiments allow the process to continue in this manner for any suitable number of additional tasks and/or realms. For example, the client device application 516 may request a third task at a third realm after sending the second request and before the second task is completed at the first realm 150, request a fourth task at a fourth realm simultaneously, and/or initiate any other tasks at any other realms in any suitable order and timeframe (e.g., without needing to login immediately before each task is requested).

The following description describes, in more detail, processes for establishing an access session, according to certain embodiments. Certain embodiments allow any suitable login process to be utilized, such as a single sign-on process.

Figure 5:
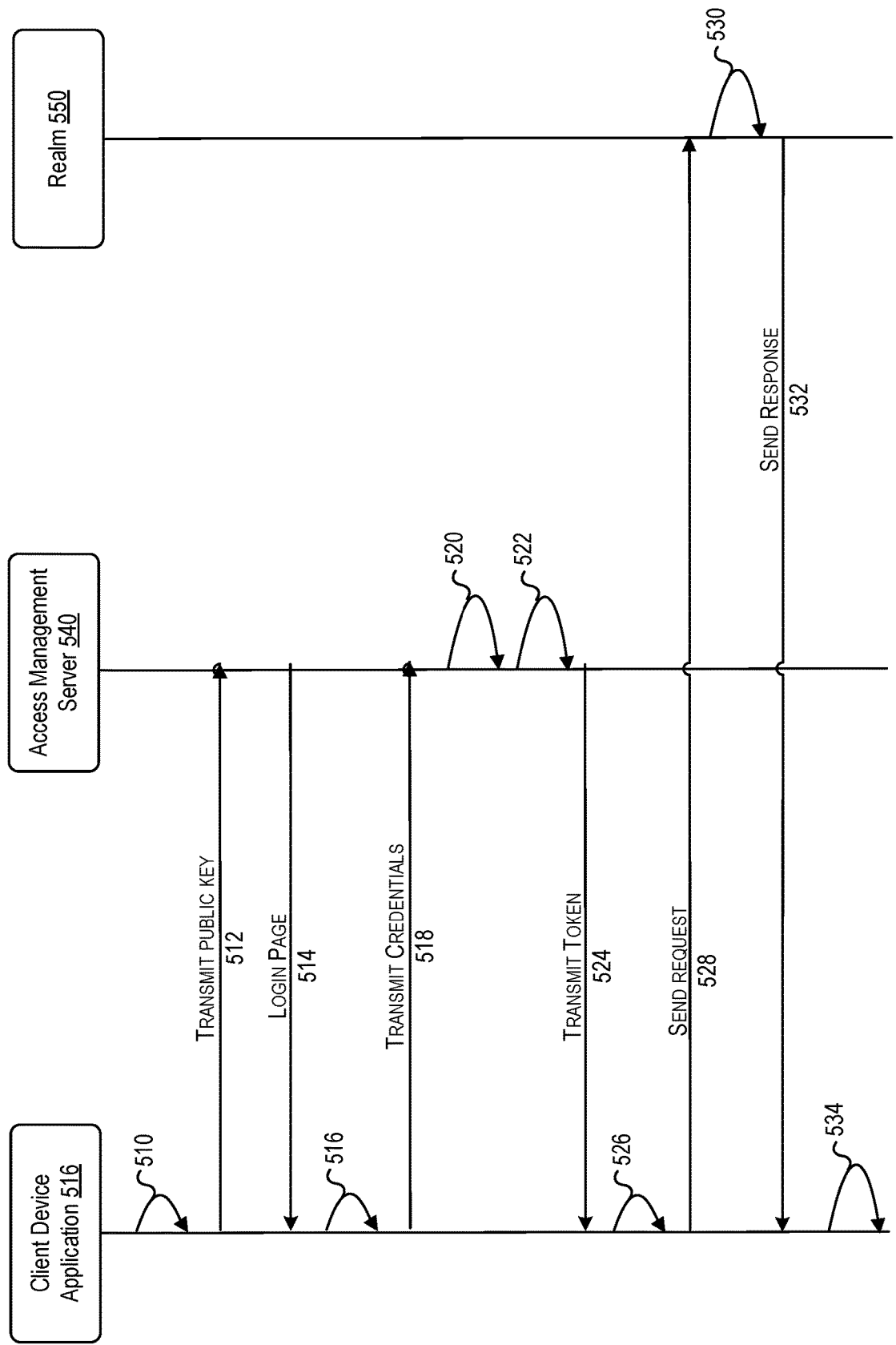
FIG. 5 illustrates an example flowchart for accessing a system, in accordance with one or more embodiments.

FIG. 5 illustrates an example flowchart for accessing a system, in accordance with one or more embodiments. The operations of the flow can be implemented as hardware circuitry and/or stored as computer-readable instructions on one or more non-transitory computer-readable mediums of one or more computer systems. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

At 510, a user may operate an application 516 at a client device to establish a session for access to a first realm 550. This can include clicking a hyperlink or entering a URL for the first realm 550 (or for a specific resource at the realm) into a web browser, or otherwise using an application 516 operating on the client device to engage in communication with the first realm 550.

In some embodiments, the client device application 516 may generate and send a request for access to the first realm 550 or an access management server 540 of the first realm 550. In some embodiments, the first realm 550 can redirect the request to an access management server 540 for authentication. In some embodiments, the access management server 540 can intercept access requests sent by the client device application 516.

The client device application 516, in communication with the access management server 540, may then generate one or more encryption keys as part of a login process. For example, the client device application 516 may load a console from the access management server 540 provided in response to the access request, which can prompt the generation of keys. In some embodiments, the client device application 516 (e.g., a console executed by the application) generates a public/private key pair for a session. The client device application 516 can store the private key in a secure isolate local data store (e.g., an indexedDB) so that it is protected from access by other applications and sessions. The private key can be stored so that it cannot be extracted. It may also be stored in volatile memory so that it is automatically erased when the client device application 516 is closed or the client device is powered off.

At 512, the client device application 516 can transmit the generated public key to the access management server 540. The access management server 540 can receive and store (e.g., in a session data store) the public key from the client device application 516. In some embodiments, the client device application 516 may use the private key to create a digital signature (e.g., for the message with the public key), and the access management server 540 may use the public key to validate the signature.

At 514, the access management server 540 can initiate an authentication process (e.g., in response the access request from the client device application 516). For example, the access management server 540 can communicate with the client device application 516 to request and obtain credentials to authenticate the user. This can include transmitting a login page to the client device application 516 for entering login credentials, or otherwise redirecting the client device application 516 to a page for entering credentials.

At 516, the client device application 516 can then prompt the user 103 to input a first set of credentials for the accessing the first realm 550. For example, the client device application 516 (e.g., web browser) can display the login webpage or another suitable interface.

The client device application 516 can then receive one or more credentials from the user 103. For example, the user 103 can type or otherwise enter a username, a password, tenancy information, and/or other credentials into the login webpage.

At 518, the client device application 516 can transmit the user credentials to the access management server 540. The client device application 516 may encrypt the credentials, for example using a session key or a public key associated with the access management server 540, which the access management server 540 can then decrypt. In some embodiments, the client device application 516 may digitally sign a message with the credentials using the generated private key.

At 520, the access management server 540 can determine authentication and/or authorization of the user 103 based on the credentials supplied by the client device application 516. In some embodiments, authentication and/or authorization of the user 103 may involve retrieving information (e.g., subject information) about the user 103 from one or more data stores of an access management server. The information may include user identity and access information which can be compared with the supplied credentials.

At 522, if the authentication and authorization of the user 103 is successful, then the access management server 540 may establish a new session for the user to 103. The session may allow the user 103 to access the realm 550, which can include using resources at the realm 550 and/or modifying settings at the realm 550. For example, the access management server 540 may recognize, based on user authorization, that the user 103 is an administrator. The access management server 540 may then grant the user 103 administrative privileges, such as the ability to update software and configurations at the realm 550.

Establishing a new session can include creating a signed access claim, such as a security token, for the session. The security token can include information about how the client device application 516 was authenticated, and the level of authorization. The security token can also include the public key generated by the client device application 516, so the realm 550 can be assured that the public key is associated with the client device application 516, and then the realm 550 can validate future messages signed by the client device application 516. The access management server 540 can digitally sign the security token using a private key associated with the access management server 540. As a result, the realm 550 can later validate and trust that the security token was provided by the access management server 540.

Establishing a new session can also include generating session key and/or providing any other suitable information and tools for communication between the client device application 516 and realm 550. In some embodiments, the access management server 540 also creates an identity token, which can include information about the identity and/or authorization level of the user. The access management server 540 may store the security token, a session key, an identity token, and any other suitable information about the session.

At 524, the access management server 540 can transmit a response to the client device application 516 indicating that authentication was successful and an access session has been established. The response can include the generated security token. The response can also include some or all of the session information, such as a session key, an identity token, an identity data store identifier, and/or a domain name identifier of the authenticated user which the client device application 516 can use for subsequent communications with the realm 550. For example, the realm 550 can identify an access session, retrieve session data, and/or retrieve security data from the access management server 540 when needed during future communications based on information possessed and provided by the client device application 516.

At 526, the client device application 516 can store the security token and/or other received session information in the securely isolated storage area for the session (e.g., along with the previously generated private key and/or other session data). Accordingly, the client device application 516 can receive a first security token for a first access session with a first realm 550. The user 103 can thereby be logged in for interaction with the realm 550 through, for example, a single sign-on session.

The client device application 516 can isolate the session information and any subsequent communications with the realm 550 so that it is restricted from sharing with other applications on the device, as well as restricted from sharing with other concurrent sessions with other realms or servers. This separation can be accomplished using, for example, holder-of-key functionality at a web browser. In some embodiments, all information associated with the access session can be encrypted and/or stored in an isolated data store in an isolated part of the client device application 516. As a result, information is not shared across concurrent sessions with different servers.

At 528, with the session activated, the client device application 516 can communicate with the realm 550. For example, the client device application 516 can send a request to access a resource at the realm 550. The request can include the security token and/or a Security Assertion Markup Language (SAML) assertion generated using the security token. Additionally, the client device application 516 can generate a digital signature for the request using the client device's private key for the session. The security token and keys stored in the isolated data store can be used for the request. In some embodiments, some or all of the request message data can be encrypted using, for example, a public key associated with the realm or a session key provided by the access management server 540.

In some embodiments, the client device application 516 may prompt the user for further credentials when the user initiates subsequent interactions with the realm 150. For example, the client device application 516 may prompt the user to input a PIN or another secondary set of credentials to when the user wants to perform certain tasks, when the user re-initiates communications after some amount of time has elapsed (e.g., 10 minutes), after the user 103 has interacted with another realm during with a different session, or at any other suitable time.

At 530, the realm 550 (e.g., a server computer within a realm data center) can receive and validate the request message. For example, the realm 550 can validate the security token and/or SAML assertion (e.g., by validating an attached access management server digital signature using an access management server 540 public key), the realm 550 can verify that the client device application 516 is authenticated and authorized based on the security token and/or SAML assertion, the realm 550 can verify that the request came from the client device application 516 (e.g., by validating an attached client device digital signature using the client device's public key), and/or the realm 550 can decrypt encrypted information using a realm private key or a session key. In some embodiments, the realm 550 may communicate with the access management server 540 in order to validate the request. For example, the access management server 540 may provide public keys to the realm 550 or verify one or more tokens.

The realm 550 can then provide resources or perform any other tasks requested by the client device application 516. At 532, the realm 550 can send a response message to the client device application 516 indicating that a task was performed or providing any other suitable access information.

As described above, certain embodiments allow the client device application 516 to maintain multiple separate sessions at the same time without sharing data between the sessions. Accordingly, the flow can continue at 534 with the user operating the client device application 516 to establish a second access session for access to a second realm, this second access session being separate from the first access session. The authentication and access process described above for steps 510-532 can be repeated for accessing the second realm. The client device application 516 can generate a second private key, provide a second set of credentials, receive a second security token, etc., in order to gain access to the second session with the second realm. Information for the second session can be stored in a second isolated data store away from the first isolated data store. Additional simultaneous sessions can also be established with a third realm, a fourth realm, and so forth.

Figure 6:
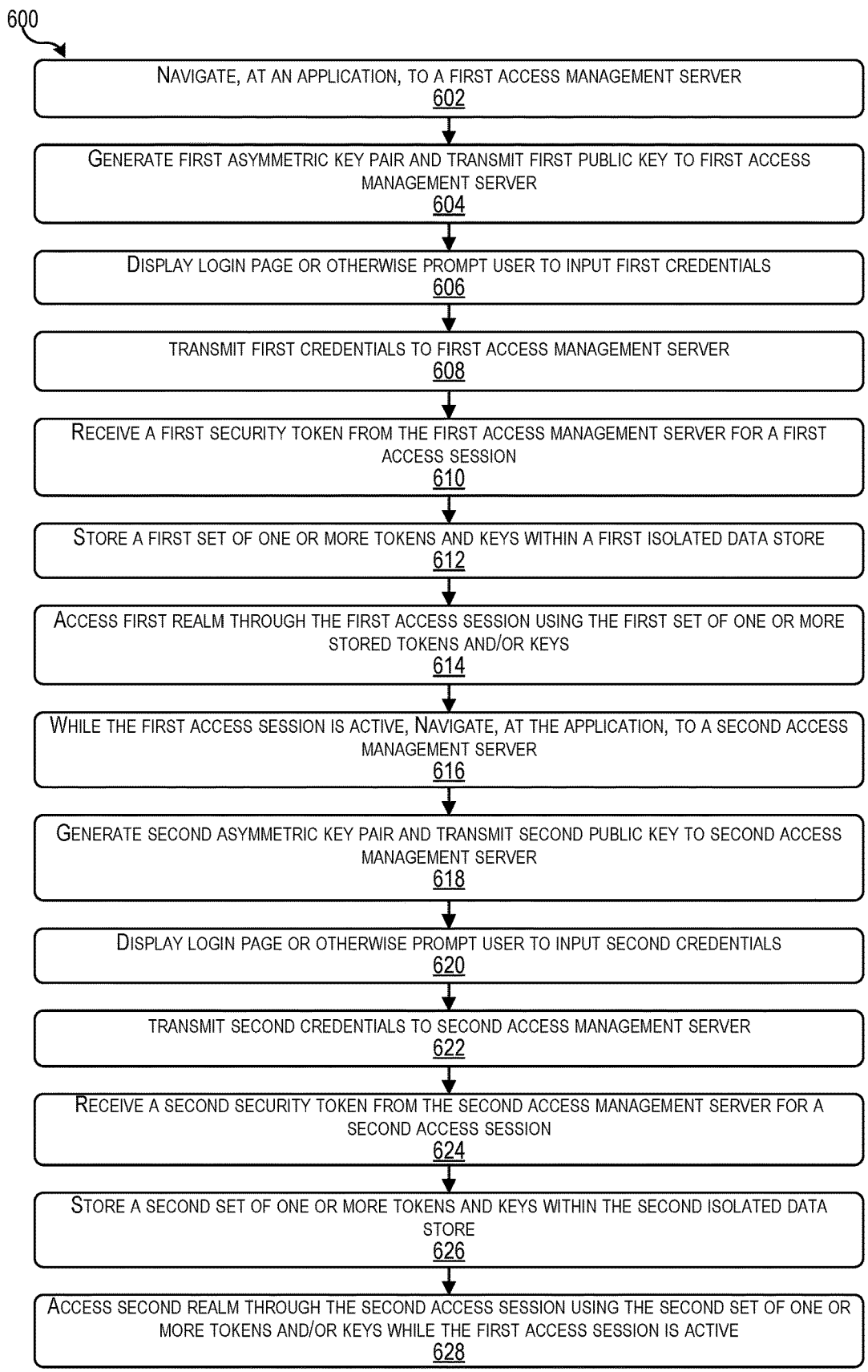
FIG. 6 illustrates an example flow of communications that take place to access multiple systems simultaneously while maintaining security boundaries, in accordance with one or more embodiments.

FIG. 6 illustrates an example flow of communications that take place to access multiple systems simultaneously while maintaining security boundaries, in accordance with one or more embodiments. FIG. 6 illustrates a similar process as the process shown in FIG. 5, but the process in FIG. 6 emphasizes the steps performed by the client device application, and the process in FIG. 6 describes establishing two separate access sessions. The operations of the flow can be implemented as hardware circuitry and/or stored as computer-readable instructions on a non-transitory computer-readable medium of a computer system, such as the client device 106 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

At 602, a user may navigate, at an application 116 of a client device 106, to a first access management server 140 in order to establish a session for access to a first realm 150. This can include clicking a hyperlink or entering a URL for the first realm 150 (or for a specific resource at the realm) into a web browser, or otherwise using an application 116 operating on the client device 106 to engage in communication with the first realm 150.

At 604, the application 116 at the client device 106 may then generate one or more encryption keys as part of a login process. For example, the application 116 can generate a first asymmetric key pair for a session. The application 116 can store the first private key and/or the first public key of the first asymmetric key pair in a first secure isolated local data store (e.g., an indexedDB) so that it is protected from access by other applications and sessions. The first private key can be stored so that it cannot be extracted. It may also be stored in volatile memory so that it is automatically erased when the application 116 is closed or the client device 106 is powered off.

The application 116 at the client device 106 can also transmit the generated first public key to the first access management server 140 as part of a request for accessing the first realm 150. The first access management server 140 may respond by providing a login page for entering credentials.

At 606, the application 116 at the client device 106 can then prompt the user 103 to input a first set of credentials for the accessing the first realm 150. For example, the client device 106 (e.g., via web browser or other application 116) can display the login webpage or another suitable interface. The application 116 at the client device 106 can then receive one or more first credentials from the user 103. For example, the user 103 can type or otherwise enter a first username, a first password, first tenancy information, and/or other first credentials into the login webpage.

At 608, the application 116 at the client device 106 can transmit the first user credentials to the first access management server 140. The application 116 may encrypt the first credentials, for example using a first session key or a first public key associated with the first access management server 140, which the first access management server 140 can then decrypt. In some embodiments, the application 116 may digitally sign a message with the first credentials using the generated first private key.

The first access management server 140 can the determine authentication and/or authorization of the user 103 based on the credentials supplied by the application 116 at the client device 106. If authentication and authorization of the user 103 is successful, then the first access management server 140 may establish a first session for the user 103. Establishing a first session can include creating a first signed access claim, such as a first security token, for the first session. The first security token can include the first public key generated by the client device 106, so the first realm 150 can be assured that the first public key is associated with the client device 106.

At 610, the application 116 at the client device 106 can receive the first security token from the first access management server 140 in a response message indicating that authentication was successful and a first access session has been established. The response can also include some or all of the session information, such as a session key, an identity token, an identity data store identifier, and/or a domain name identifier of the authenticated user.

At 612, the application 116 at the client device 106 can store a first set of one or more tokens and/or keys within a first isolated data store. For example, the first security token, a first identity token, and other first session information along with the generated first asymmetric key pair in a data storage area that is securely separated from other data storage areas. Accordingly, the application 116 at the client device 106 can receive a first security token for a first access session with a first realm 150. The user 103 can thereby be logged in for interaction with the first realm 150.

The application 116 at the client device 106 can isolate the first session information and any subsequent communications with the first realm 150 so that the first realm 150 is restricted from sharing with other applications on the device, as well as restricted from sharing with other concurrent sessions with other realms or servers.

At 614, with the first session activated, the application 116 at the client device 106 can access the first realm 150 through the first access session using the first set of one or more stored tokens and/or keys. For example, the application 116 at the client device 106 can send a request to access a resource (or perform any other suitable task) at the realm 150. The request can include the security token and/or a Security Assertion Markup Language (SAML) assertion generated using the security token. Additionally, the application 116 can generate a digital signature for the request using the client device's first private key for the session. In some embodiments, some or all of the request message data can be encrypted using, for example, a first public key associated with the first realm 150 or a first session key provided by the first access management server 140. The first realm 150 can receive and validate the request and perform a task (e.g., access a resource or provision new resources). The application 116 at the client device 106 can continue to communicate and interact with the first realm 150 in any suitable manner through the first session.

At 616, while the first session still active (e.g., while communications like the request in 614 are still taking place between the application 116 at the client device 106 and the first realm 150), the user may navigate, using the application 116 of a client device 106, to a second access management server 170 in order to establish a second session for access to a second realm 160, this second access session being separate from the second access session. For example, this can include clicking a second hyperlink that opens a second browser tab or window, entering a second URL for the second realm 160 (or for a specific resource at the second realm) into a second tab or window of a web browser, or otherwise using the application 116 operating on the client device 106 to engage in communications with the second realm 160. The second realm 160, when contacted, may redirect the application 116 to the second access management server 170.

At 618, the application 116 at the client device 106 may then generate one or more second encryption keys as part of a login process. For example, the application 116 can generate a second asymmetric key pair for a second session. The application 116 can store the second private key and/or the second public key of the second asymmetric key pair in a second secure isolated local data store (e.g., a second indexedDB) so that it is protected from access by other applications and sessions. The second private key can be stored so that it cannot be extracted. It may also be stored in volatile memory so that it is automatically erased when the application 116 is closed or the client device 106 is powered off.

The application 116 at the client device 106 can also transmit the generated second public key to the second access management server 170 as part of a request for accessing the second realm 160. The second access management server 170 may respond by providing a login page for entering credentials.

At 620, the application 116 at the client device 106 can then prompt the user 103 to input a second set of credentials for the accessing the second realm 160. For example, the client device 106 (e.g., via web browser or other application 116) can display the second login webpage or another suitable interface. The application 116 at the client device 106 can then receive one or more second credentials from the user 103. For example, the user 103 can type or otherwise enter a second username, a second password, second tenancy information, and/or other second credentials into the login webpage. The second credentials and a second tenancy can be different than the first credentials and a first tenancy.

At 622, the application 116 at the client device 106 can transmit the second user credentials to the second access management server 170. The application 116 may encrypt the second credentials, for example using a second session key or a second public key associated with the second access management server 170, which the second access management server 170 can then decrypt. In some embodiments, the application 116 may digitally sign a message with the second credentials using the generated second private key.

The second access management server 170 can the determine authentication and/or authorization of the user 103 based on the credentials supplied by the application 116 at the client device 106. If authentication and authorization of the user 103 is successful, then the second access management server 170 may establish a second session for the user 103. Establishing a second session can include creating a second signed access claim, such as a second security token, for the second session. The second security token can include the second public key generated by the client device 106, so that the second realm 160 can be assured that the second public key is associated with the application 116 at the client device 106 when the second realm 160 later validates the second security token.

At 624, the application 116 at the client device 106 can receive the second security token from the second access management server 170 in a response message indicating that authentication was successful and a second access session has been established. The response can also include some or all of the session information, such as a second session key, a second identity token, a second identity data store identifier, and/or a second domain name identifier of the authenticated user.

At 626, the application 116 at the client device 106 can store a second set of one or more tokens and/or keys within a second isolated data store for the second session. For example, the second security token, a second identity token, and other second session information along with the generated second asymmetric key pair in a data storage area that is securely separated from other data storage areas. Information for the second session can be stored in a second isolated data store that is separate from the first isolated data store, such that information is not shared between different isolated data stores.

Accordingly, the application 116 at the client device 106 can receive a second security token for a second access session with a second realm 160. The user 103 can thereby be logged in for interaction with the second realm 160. The application 116 at the client device 106 can isolate the second session information and any subsequent communications with the second realm 160 so that the second realm 160 is restricted from sharing with other applications on the device, as well as restricted from sharing with other concurrent sessions with other realms or servers.

At 628, with the second session activated, the application 116 at the client device 106 can access the second realm 160 through the second access session using the second set of one or more stored tokens and/or keys. For example, the application 116 at the client device 106 can send a request to access a resource (or perform any other suitable task) at the second realm 160. The request can include the security token and/or a Security Assertion Markup Language (SAML) assertion generated using the security token. Additionally, the application 116 can generate a digital signature for the request using the client device's second private key for the second session. In some embodiments, some or all of the request message data can be encrypted using, for example, a second public key associated with the second realm 160 or a second session key provided by the second access management server 170. The second realm 160 can receive and validate the request and perform a task (e.g., access a resource or provision new resources).

The application 116 at the client device 106 can continue to communicate and interact with the second realm 160 in any suitable manner through the second session, as well as communicate and interact with the first realm 150 in any suitable manner through the first session. Certain embodiments allow additional process steps to be included for activating additional simultaneous sessions with any suitable number of additional realms, such as a third session for communicating with a third realm, a fourth session for accessing a fourth realm, and so forth.

Accordingly, the user 103 may be able to maintain two or more access sessions for two or more different domains (e.g., realms) at the same time through one application 116 and/or client device 106. This can allow the user 103 to efficiently switch between interacting with the different domains as needed, all while maintaining security boundaries between the two sessions and domains. Additionally, the user 103 can automate updates to happen across multiple domains iteratively and/or simultaneously without needing to logout of a first domain and login to a second domain when the application 116 at the client device 106 is finished providing updates to the first domain and ready to provide updates to the second domain.

Example IaaS Infrastructure Implementation

As noted above, infrastructure as a service (IaaS) is one particular type of cloud computing IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network in some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
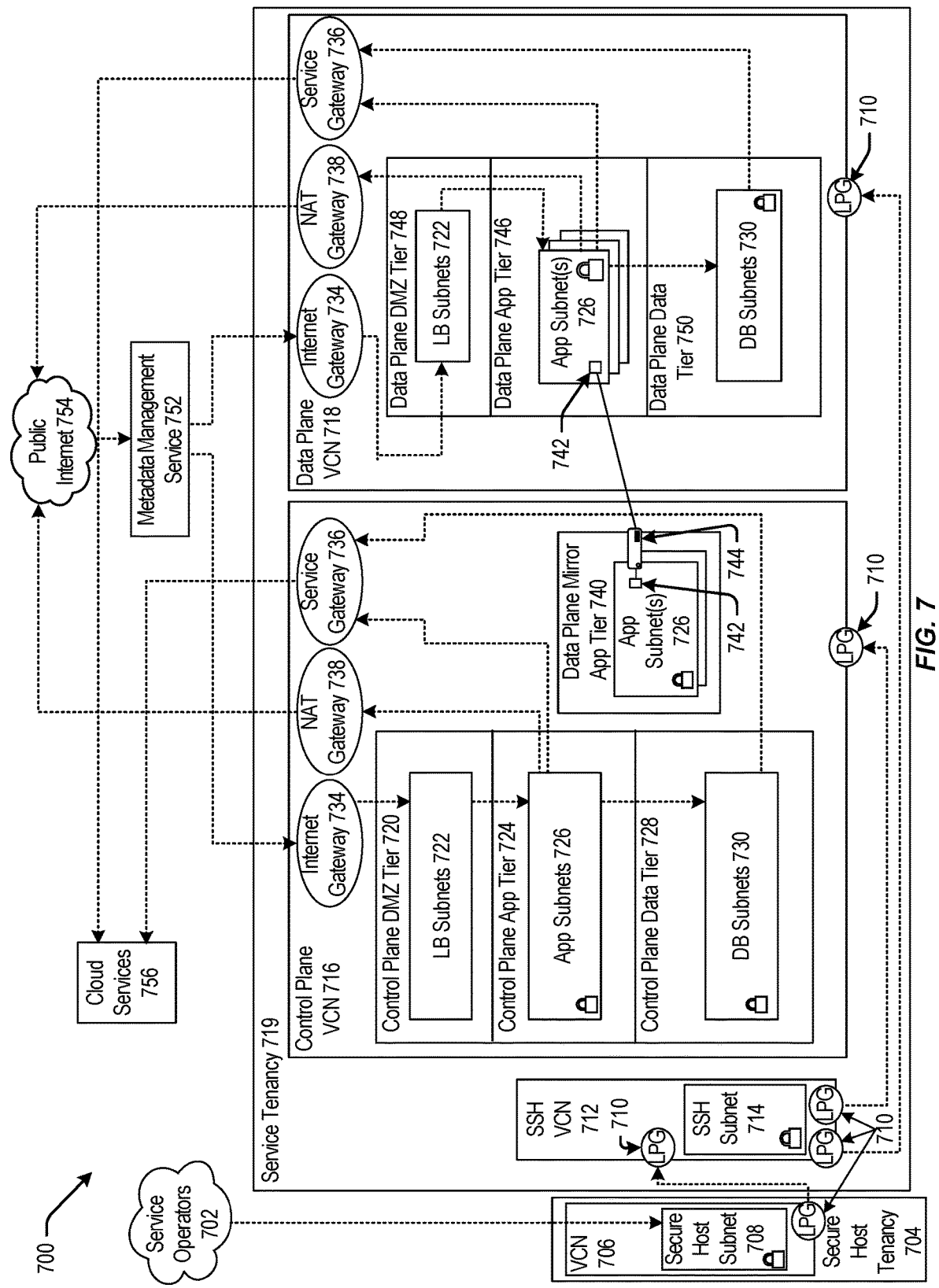
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep security breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plan VCN 718 can make application programming interface (API) calls to cloud services 756 without going through public Internet 754. The API calls to cloud services 756 from the service gateway 736 can be one-way the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of security, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
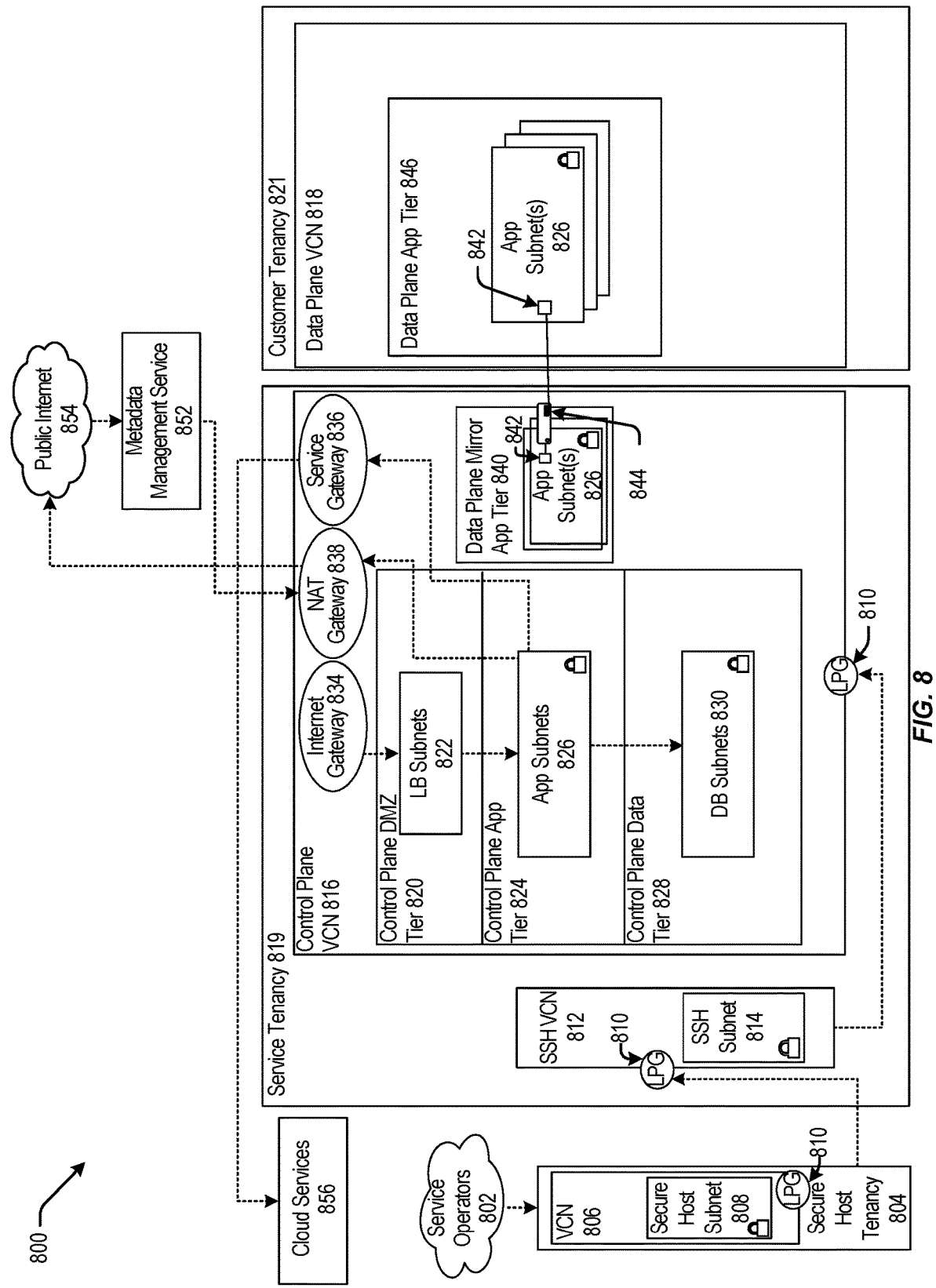
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plan app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818 in this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
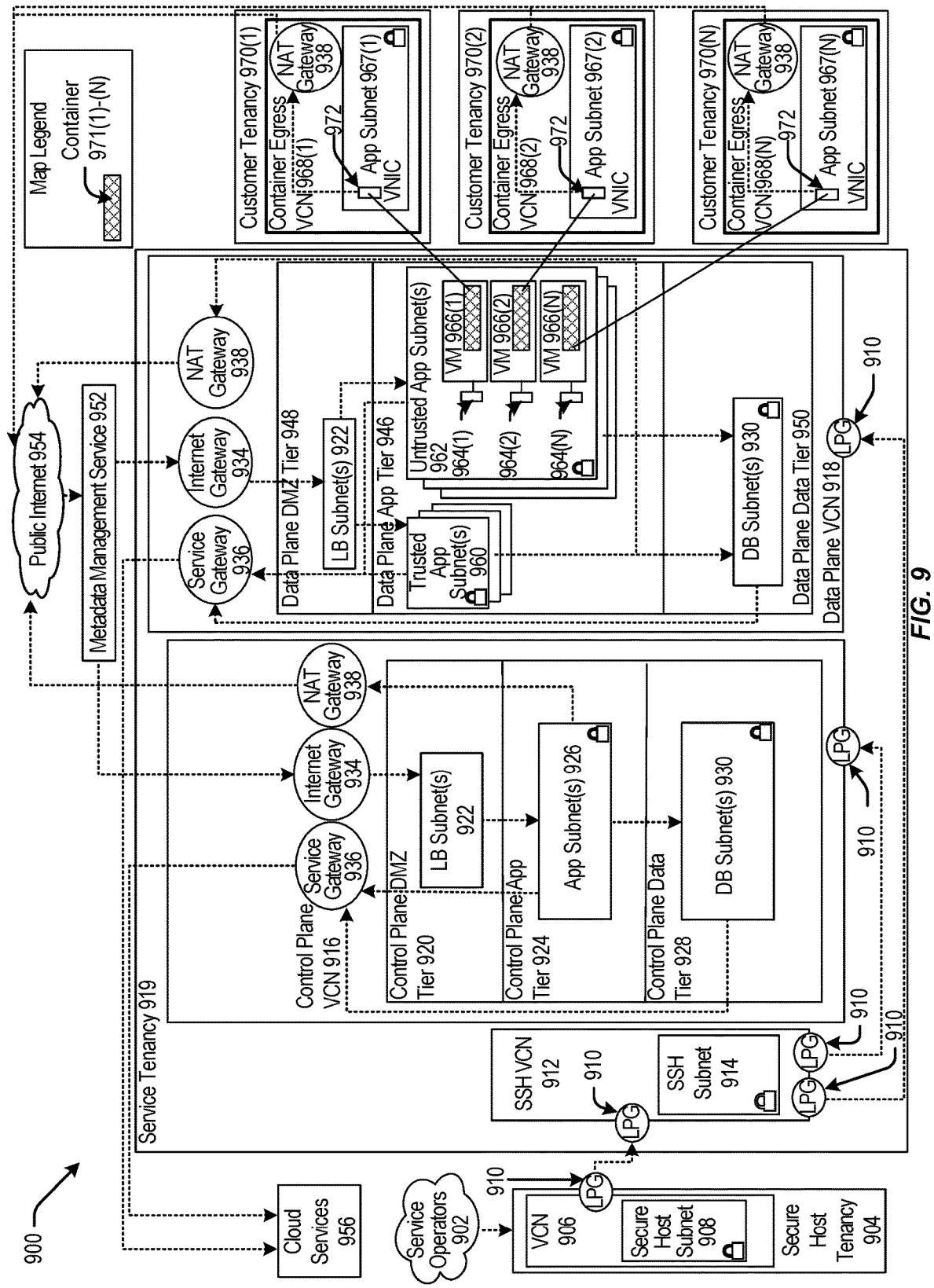
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
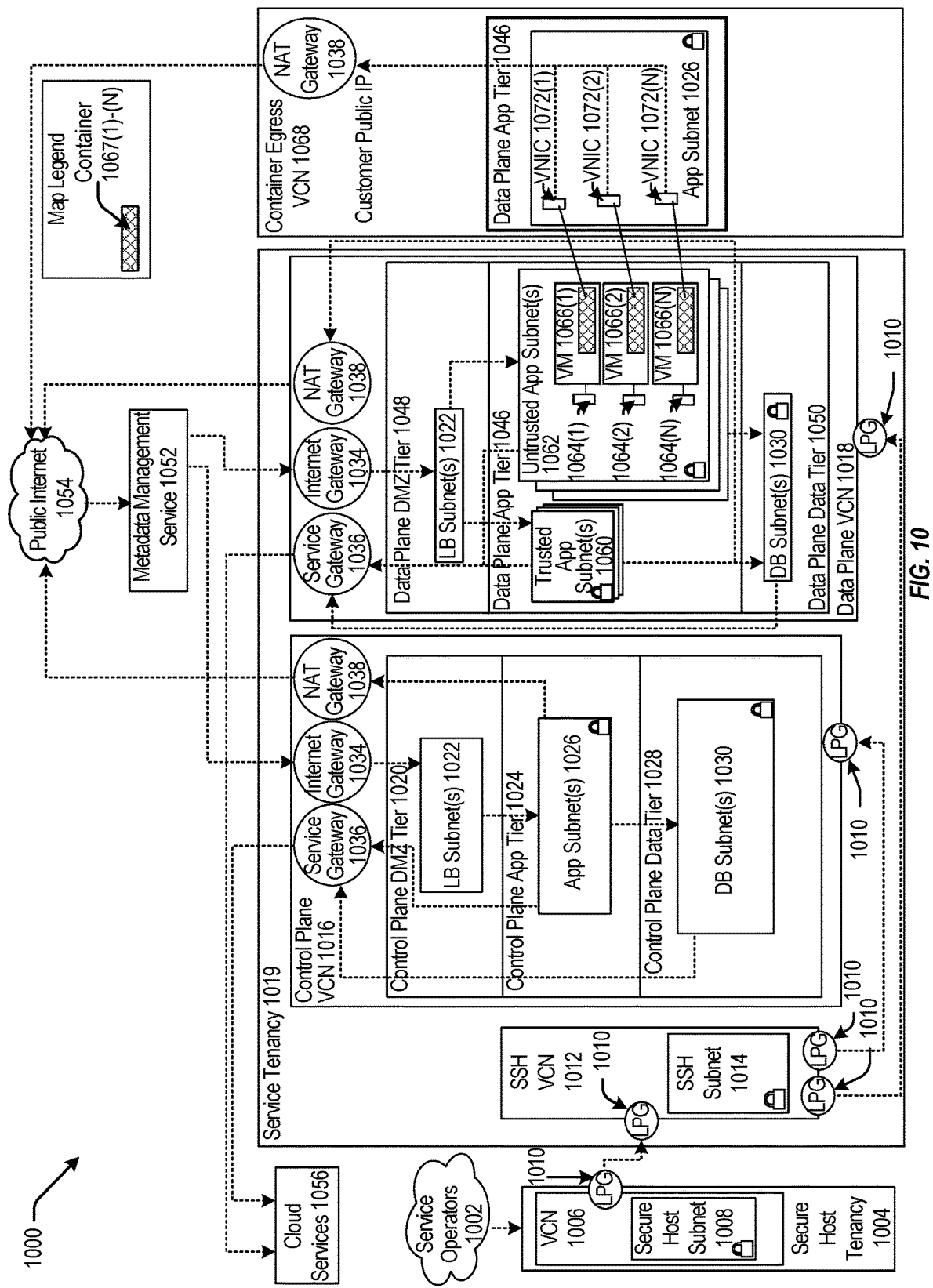
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate some embodiments In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
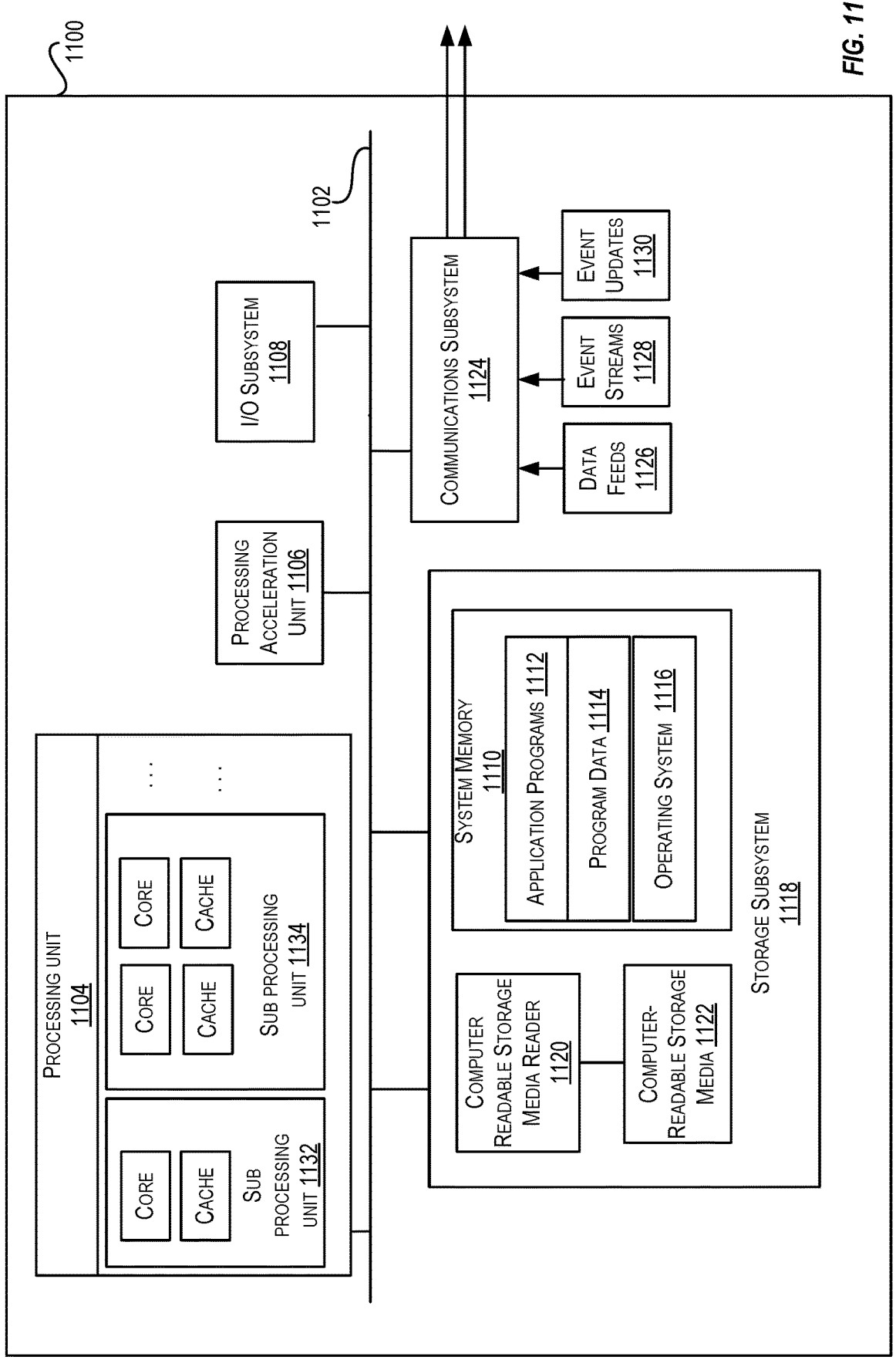
FIG. 11 is a block diagram illustrating an example computer system, according to at least one embodiment.

FIG. 11 illustrates an example computer system 1100, in which various embodiments of the present disclosure may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z" unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    establishing a first session between an application and a first realm after successful authentication of a user for the first realm;
    storing, by the application, a first set of one or more keys for the first session in a first isolated data store;
    while the first session is active between the application and the first realm, establishing a second session between the application and a second realm after successful authentication of the user for the second realm, wherein the first realm includes a first set of data centers, wherein the second realm includes a second set of data centers, and wherein data is not shared between the first realm and the second realm;
    storing, by the application, a second set of one or more keys for the second session in a second isolated data store that is separate from the first isolated data store, wherein the application isolates the first session with the first realm from the second session with the second realm so that information is not shared between the first realm and the second realm;
    executing, by the application, instructions that cause a first request to be generated and communicated to the first realm via the first session, the first request requesting a first task to be performed in the first realm, wherein the instructions include:
        sending, to the first realm via the first session, using one or more keys from the first set of one or more keys and without re-authentication of the user, the first request for the first task to be performed, wherein the first task is for a first tenancy in the first realm; and
        receiving, from the first realm via the first session, a particular status code generated due to execution of the first task by the first realm; and
    responsive to receiving the particular status code from the first realm, executing, by the application, instructions that cause a second request to be generated and communicated to the second realm via the second session, the second request requesting a second task to be performed in the second realm, wherein the instructions include:
        sending, to the second realm via the second session, using one or more keys from the second set of one or more keys and without re-authentication of the user, the second request for the second task to be performed, wherein the second task is for a second tenancy in the second realm.

2. The method of claim 1, wherein the first tenancy is a tenancy for a first customer, and wherein the second tenancy is a tenancy for a second customer.

3. The method of claim 2, wherein the first tenancy includes a first compute, a first memory, and first networking resources provided in the first realm by a cloud services provider, and wherein the second tenancy includes a second compute, a second memory, and second networking resources provided in the second realm by the cloud services provider.

4. The method of claim 1, wherein the first task comprises installing a set of one or more updates at the first realm, and wherein the second task comprises installing the set of one or more updates at the second realm.

5. The method of claim 1, wherein the particular status code indicates that the first task has completed successfully.

6. The method of claim 1, wherein the first task includes at least one of installing a set of one or more updates at the first realm, provisioning a resource, utilizing a resource, updating configurations, and modifying the first tenancy, and wherein the second task includes at least one of installing the set of one or more updates at the first realm, provisioning a resource, utilizing a resource, updating configurations, and modifying the second tenancy.

7. A method, comprising:
   establishing a first session between an application and a first realm after successful authentication of a user for the first realm;
   storing, by the application, a first set of one or more keys for the first session in a first isolated data store;
   while the first session is active between the application and the first realm, establishing a second session between the application and a second realm after successful authentication of the user for the second realm;
   storing, by the application, a second set of one or more keys for the second session in a second isolated data store that is separate from the first isolated data store, wherein the application isolates the first session with the first realm from the second session with the second realm;
   executing, by the application, instructions that cause a first request to be generated and communicated to the first realm via the first session, the first request requesting a first task to be performed in the first realm, wherein the instructions include:
   sending, to the first realm via the first session, using one or more keys from the first set of one or more keys and without re-authentication of the user, the first request for the first task to be performed, wherein the first task is for a first tenancy in the first realm; and
   after sending the first request and before the first task is completed, executing, by the application, instructions that cause a second request to be generated and communicated to the second realm via the second session, the second request requesting a second task to be performed in the second realm, wherein the instructions include:
   sending, to the second realm via the second session, using one or more keys from the second set of one or more keys and without re-authentication of the user, the second request for the second task to be performed, wherein the second task is for a second tenancy in the second realm.

8. The method of claim 7, wherein the application comprises a web browser.

9. The method of claim 7, wherein establishing the first session comprises:
   displaying, by the application, a user interface for entering one or more user credentials; and
   receiving, by the application, the one or more user credentials via the user interface.

10. The method of claim 7, wherein establishing the first session comprises:
   generating a first asymmetric key pair including a first private key and a first public key;
   sending, from the application to a first access management server, the first public key and a first set of one or more user credentials, wherein the first access management server uses the first set of one or more user credentials for authentication; and
   receiving, by the application from the first access management server, a first security token for the first session; and
   wherein establishing the second session comprises:
   generating a second asymmetric key pair including a second private key and a second public key;
   sending, from the application to a second access management server, the second public key and a second set of one or more user credentials, wherein the second access management server uses the second set of one or more user credentials for authentication; and
   receiving, by the application from the second access management server, a second security token for the second session.

11. The method of claim 10, wherein executing the first task for the first realm further comprises:
   generating a first digital signature for the first request using the first private key; and
   wherein executing the second task for the second realm further comprises:
   generating a second digital signature for the second request using the second private key.

12. The method of claim 7, wherein the first tenancy is a tenancy for a first customer, the first tenancy includes a first compute, a first memory, and first networking resources provided in the first realm by a cloud services provider, the second tenancy is a tenancy for a second customer, and the second tenancy includes a second compute, a second memory, and second networking resources provided in the second realm by the cloud services provider.

13. The method of claim 7, wherein the first isolated data store is a first local IndexedDB, and wherein the second isolated data store is a second local IndexedDB.

14. A non-transitory computer-readable storage medium, storing computer-executable instructions that, when executed, cause one or more processors of a computer system to perform a method comprising:
   establishing a first session between an application and a first realm after successful authentication of a user for the first realm;
   storing a first set of one or more keys for the first session in a first isolated data store;
   while the first session is active between the application and the first realm, establishing a second session between the application and a second realm after successful authentication of the user for the second realm;
   storing a second set of one or more keys for the second session in a second isolated data store that is separate from the first isolated data store, wherein the application isolates the first session with the first realm from the second session with the second realm;

executing instructions that cause a first request to be generated and communicated to the first realm via the first session, the first request requesting a first task to be performed in the first realm, wherein the instructions include:

sending, to the first realm via the first session, using one or more keys from the first set of one or more keys and without re-authentication of the user, the first request for the first task to be performed, wherein the first task is for a first tenancy in the first realm; and receiving, from the first realm via the first session, a particular status code generated due to execution of the first task by the first realm; and responsive to receiving the particular status code from the first realm, executing instructions that cause a second request to be generated and communicated to the second realm via the second session, the second request requesting a second task to be performed in the second realm, wherein the instructions include:

sending, to the second realm via the second session, using one or more keys from the second set of one or more keys and without re-authentication of the user, the second request for the second task to be performed, wherein the second task is for a second tenancy in the second realm.

15. The non-transitory computer-readable storage medium of claim 14, wherein the second request is sent to the second realm after sending the first request is sent to the first realm and before the first task is completed at the first realm.

16. The non-transitory computer-readable storage medium of claim 15, wherein the particular status code indicates that the first task was initiated successfully and is currently in progress.

17. The non-transitory computer-readable storage medium of claim 14, wherein the first tenancy is a tenancy for a first customer, the first tenancy includes a first compute, a first memory, and first networking resources provided in the first realm by a cloud services provider, the second tenancy is a tenancy for a second customer, and the second tenancy includes a second compute, a second memory, and second networking resources provided in the second realm by the cloud services provider.

18. The non-transitory computer-readable storage medium of claim 14, wherein the first task comprises installing a set of one or more updates at the first realm, and wherein the second task comprises installing the set of one or more updates at the second realm.

19. The non-transitory computer-readable storage medium of claim 14, wherein the application comprises a web browser, wherein the web browser stores the first set of one or more keys such that the first set of one or more keys is not extractable, and wherein the web browser stores the second set of one or more keys such that the second set of one or more keys is not extractable.

* * * * *

UNITED STATES PATENT AND TRADEMARK OFFICE
CERTIFICATE OF CORRECTION

| | | |
|---|---|---|
| PATENT NO. | : 11,627,123 B2 | Page 1 of 1 |
| APPLICATION NO. | : 17/069576 | |
| DATED | : April 11, 2023 | |
| INVENTOR(S) | : Stayskal et al. | |

It is certified that error appears in the above-identified patent and that said Letters Patent is hereby corrected as shown below:

In the Drawings

On sheet 1 of 1, in FIG. 1, and on the Title Page, the illustrative print figure, under Reference Numeral 116, Line 1, delete "brower)" and insert -- browser) --, therefor.

In the Specification

In Column 3, Line 27, delete "centers" and insert -- centers. --, therefor.

In Column 8, Line 56, delete "The an" and insert -- The --, therefor.

In Column 31, Line 41, delete "network in" and insert -- network. In --, therefor.

In Column 33, Line 30, delete "one-way" and insert -- one-way: --, therefor.

In Column 36, Line 5, delete "818 in" and insert -- 818. In --, therefor.

In Column 40, Line 44, delete "embodiments" and insert -- embodiments. --, therefor.

In Column 41, Line 21, delete "processors" and insert -- processors. --, therefor.

In Column 45, Line 50, delete "Z"" and insert -- Z," --, therefor.

In Column 43, Line 61, delete "evolution)," and insert -- evolution)), --, therefor.

Signed and Sealed this
Thirteenth Day of February, 2024

Katherine Kelly Vidal
*Director of the United States Patent and Trademark Office*